Jan. 23, 1962   H. BAUER ET AL   3,017,852
ARTICLE FABRICATING MACHINE
Filed May 5, 1958   8 Sheets-Sheet 1

INVENTORS.
HUGO BAUER,
F. T. MAY and
S. A. LOPENSKI
BY
ATTORNEY.

Jan. 23, 1962 H. BAUER ET AL 3,017,852
ARTICLE FABRICATING MACHINE
Filed May 5, 1958 8 Sheets-Sheet 2

INVENTORS.
HUGO BAUER,
F. T. MAY and
S. A. LOPENSKI
BY
ATTORNEY.

Jan. 23, 1962

H. BAUER ET AL 3,017,852

ARTICLE FABRICATING MACHINE

Filed May 5, 1958

INVENTORS
HUGO BAUER,
F. T. MAY and
S. A. LOPENSKI
BY
ATTORNEY.

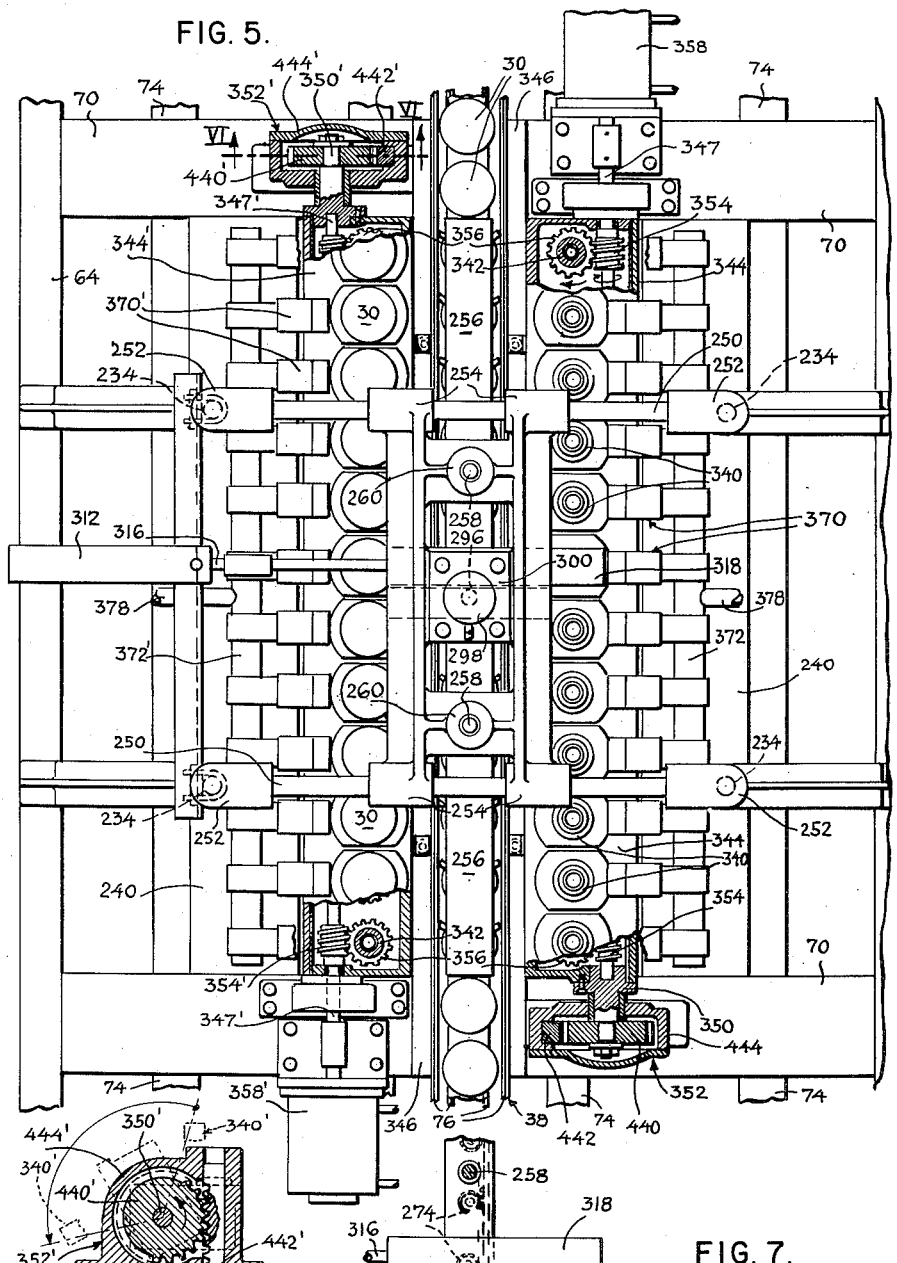

INVENTORS
HUGO BAUER
F. T. MAY and
S. A. LOPENSKI.
BY
ATTORNEY.

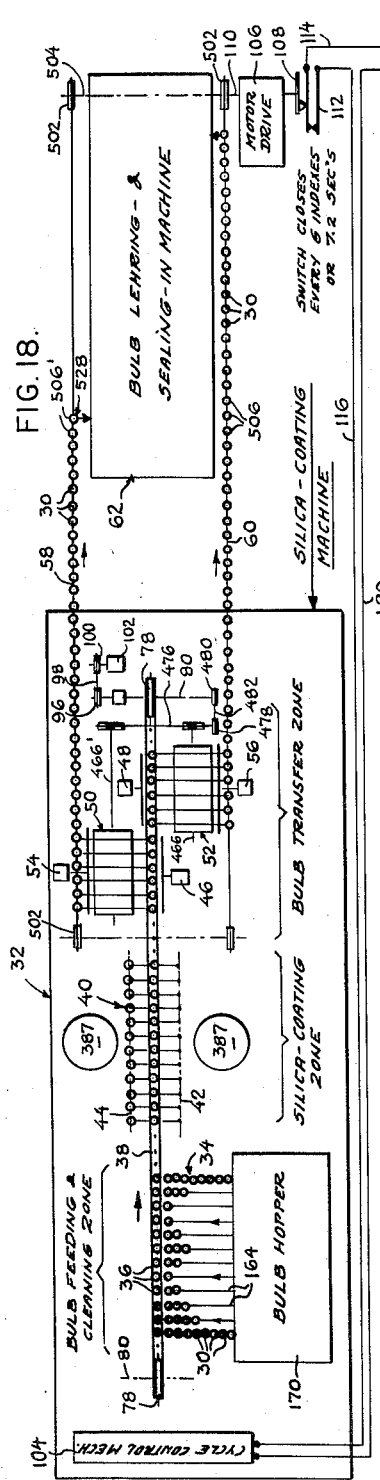

Jan. 23, 1962     H. BAUER ET AL     3,017,852
ARTICLE FABRICATING MACHINE
Filed May 5, 1958     8 Sheets-Sheet 8

FIG. 21.

INVENTORS
HUGO BAUER,
F. T. MAY and
S. A. LOPENSKI.
BY
ATTORNEY.

United States Patent Office 3,017,852
Patented Jan. 23, 1962

3,017,852
ARTICLE FABRICATING MACHINE
Hugo Bauer, Newark, Frederick T. May, Verona, and Stanley A. Lopenski, Pompton Plains, N.J., assignors to Westinghouse Electric Corporation, East Pittsburgh, Pa., a corporation of Pennsylvania
Filed May 5, 1958, Ser. No. 732,858
11 Claims. (Cl. 118—49.5)

The present invention relates to a high-speed automatic article-fabricating machine and, more particularly, to such a machine for coating the interior of an incandescent-lamp bulb with a finely divided light-scattering material, such as silica.

Heretofore incandescent lamps, discharge devices and electronic tubes have been manufactured by a group of conventional turret-type machines comprising generally a mounting machine, a sealing-in and exhausting machine and a basing machine. Specifically, in the manufacture of incandescent lamps, a machine of the type shown in U.S. Patent No. 2,811,131, issued October 29, 1957 to S. A. Lopenski is provided for electrostatically coating the lamp bulbs with silica and for lehring such coated bulbs to remove water vapor from the coated bulbs. These conventional machines transfer the work pieces or sub-assemblies from work station to work station either intermittently, as by indexing, or continuously. Due to their rotating motion and their relatively large weight, such conventional machines are limited by the factors of momentum and inertia to index speeds of about 1500 indexes per hour and production rates of about 1500 units per hour. Because of the stresses produced in these conventional machines during their operation and the limits of current engineering materials this production figure represents the maximum rate for a group of such machines. With the industry contemplating production rates of 6000 units per hour, it is essential that a new type of fabricating machine be substituted for the conventional turret-type indexing machine.

With specific reference to the above-mentioned electrostatic coating operation, it has also been found necessary in order to obtain these higher production rates to provide a separate and novel article-fabricating machine of the present invention for the silica-coating operation and a novel duplex article-fabricating machine of the type shown in copending U.S. application, Serial No. 733,077, filed May 5, 1958, by W. J. Williams et al. and assigned to the same assignee as the present application. This duplex article-fabricating machine combines the lehring operation with the sealing-in operation. In addition, the above-mentioned conventional silica-coating machine is not provided with means for automatically removing deleterious solids from the lamp bulbs prior to the coating operation. Also, the coating heads of such conventional machine do not have means for automatically removing broken lamp bulbs or cullet therefrom. Further, the lamp bulbs must be loaded and unloaded into the conventional coating heads from the outside of the turret or from above, all of which disadvantages contribute to the low production rate of such conventional type machine.

It is the general object of the present invention to avoid and overcome the foregoing and other difficulties of and objections to prior art practices by the provision of an article-fabricating machine, which is capable of producing about 6000 units per hour.

A specific object of the present invention is the provision of an improved electrostatic silica-coating machine for incandescent-lamp bulbs which is capable of automatically removing deleterious solids from the bulbs prior to the coating operation, is adapted to automatically remove any broken lamp bulbs from the coating heads and is provided with bulb holders or heads on the movable member or indexable conveyor thereof which permit loading and unloading of the lamp bulbs from either side of the conveyor.

An additional specific object is an article-fabricating machine which is operable to transfer articles to be fabricated from the indexable conveyor to one work line for fabrication and during such fabrication to transfer the fabricated articles from another work line to the portion of the conveyor vacated by the first group of articles.

The aforesaid objects of the invention and other objects which will become apparent as the description proceeds, are achieved by providing an article-fabricating machine having an indexable conveyor for receiving successive groups of articles and operable to advance each of such groups successively to an article-transfer zone and thence to an article-discharge zone. Two arrangements of article-fabricating heads are disposed adjacent the article-transfer zone of the movable member. Transfer means disposed adjacent the article-transfer zone are operable to transfer such groups of articles from the portion of the movable member in the article-transfer zone to one arrangement of the article-fabricating heads, the transfer means also being operable during the fabrication of the first group of articles to transfer a group of fabricated articles from the other arrangement of article-fabricating heads to the portion of the movable member in the article-transfer zone just vacated by the transferred group of articles.

For a better understanding of the present invention reference should be had to the accompanying drawings wherein like numerals of references indicate similar parts throughout the several views and wherein:

FIG. 5 is an enlarged plan view of the silica-coating apparatus shown in FIG. 4 and having portions thereof broken away to show the details of the tilting mechanism and rotating mechanism for the coating heads.

FIG. 6 is a fragmentary vertical-sectional view of a portion of one of the tilting mechanisms for the coating heads taken along the line VI—VI of FIG. 5 in the direction of the arrows.

FIG. 7 is a horizontal-sectional view of a mounting bar for the bulb-gripping jaws of the bulb-transfer unit and a portion of the operating mechanism for such gripping jaws, taken along the line VII—VII of FIG. 4 in the direction of the arrows.

Figure 9:
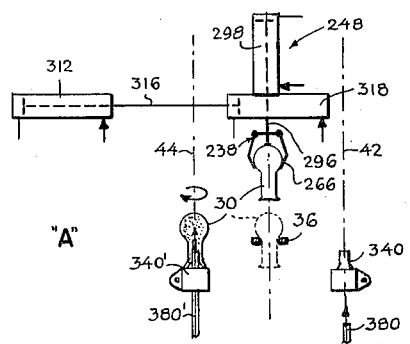

FIG. 9 is a diagrammatic side-elevational view of the bulb-transfer unit, indexable conveyor and left and right-hand silica-coating lines (as viewed in FIG. 1) and showing the position of the parts (as in FIG. 4) at time A in FIG. 21 after a group of uncoated bulbs have been secured in the gripping jaws of the bulb-transfer unit and removed upwardly from the indexable conveyor preparatory for horizontal movement thereof to the right into registry with the coating heads on the right-hand silica-coating line; and after the left-hand coating nozzles have been elevated to the second level within the rotating bulbs on the left-hand coating line where such bulbs are being silica coated.

Figure 10:
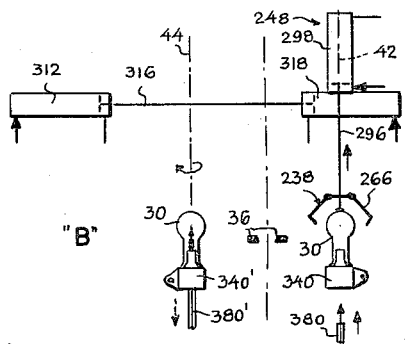

FIG. 10 is a view, similar to FIG. 9, showing the position of the parts at time B in FIG. 21 after the group of uncoated bulbs have been deposited on the right-hand silica-coating line; when the bulb-gripping jaws are in the open position preparatory for their upward retraction; and when the left-hand silica-coating line is near the end of the coating operation preparatory for retraction of the coating nozzles.

Figure 11:
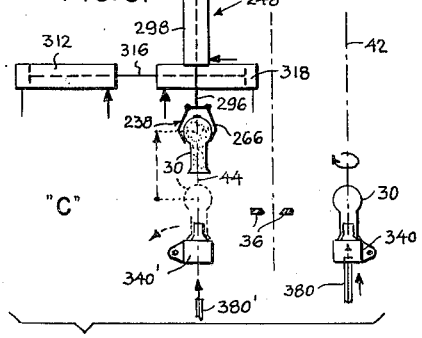

FIG. 11 is a view, similar to FIGS. 9 and 10, showing the position of the parts at time C in FIG. 21 after the bulb-transfer unit has moved the open bulb-gripping jaws horizontally to the left into registry with the coated bulbs on the left-hand silica-coating line, the jaws have descended into juxtaposition about such coated bulbs, and have secured the coated bulbs therein, and the jaws and coated bulbs have been retracted upwardly preparatory for their movement to the right into registry with the indexable conveyor, centrally located between the left and right-hand silica-coating lines; and when the right-hand coating-nozzles are moving upwardly into position within the bulbs to be silica-coated on the right-hand silica-coating lines.

Figure 12:
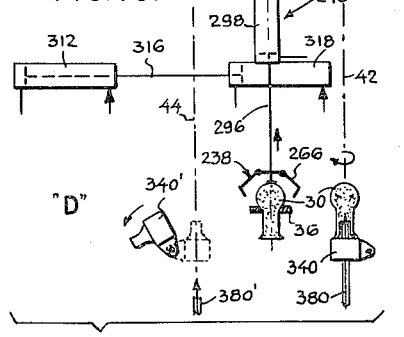

FIG. 12 is a view similar to FIGS. 9 and 11 and showing the position of the parts at time D in FIG. 21 after the silica-coated bulbs have been deposited on the indexable conveyor preparatory for its index; when the bulb-gripping jaws are in the open position preparatory for their upward retraction to a position similar to that shown in FIG. 9; when the now empty left-hand silica-coating line is tilting in counterclockwise direction to remove broken cullet from the silica-coating heads; and when the right-hand coating nozzles have been elevated to the first level within the rotating bulbs on the right-hand silica-coating line.

Figure 13:
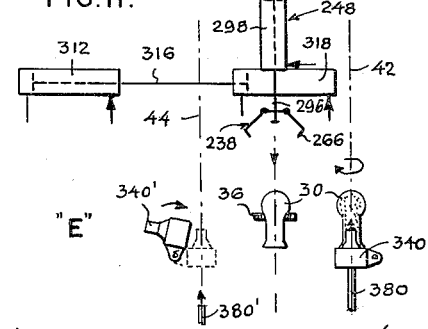

FIG. 13 is a view similar to FIGS. 9 through 12 and showing the position of the parts at time E in FIG. 21 when the open bulb-gripping jaws are in the "up" position; after a new group of uncoated bulbs have been indexed by the indexable conveyor into position therebeneath; when the coating heads on the left-hand silica-coating line are retracted in clockwise direction toward the coating position; and while the silica-coating operation being performed on the bulbs on the coating heads of the right-hand silica coating line is continuing.

Figure 14:
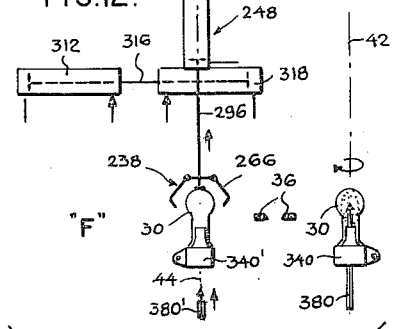

FIG. 14 is a view similar to FIGS. 9 through 13 and showing the position of the parts at time F in FIG. 21 when the bulb-transfer unit is in the position similar to FIG. 11, after the bulb-gripping jaws have descended, secured the second group of bulbs therein, removed such bulbs upwardly from the indexable conveyor and the jaws and bulbs having been moved horizontally to the left by the bulb-transfer unit into registry with the coating heads on the left-hand silica-coating line, the jaws and bulbs have descended into the "down" position to deposit such uncoated bulbs on the coating heads of the left-hand silica-coating line, and the bulb-gripping jaws have opened preparatory for their retracting upward movement; and when the right-hand coating-nozzles have been elevated to the second level within the bulbs on the right-hand silica-coating line during the continuing silica-coating operation being performed thereat.

Figure 15:
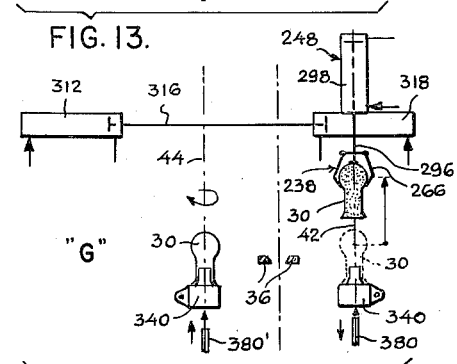

FIG. 15 is a view similar to FIGS. 9 through 14 and showing the position of the parts at time G in FIG. 21 when the bulb-transfer unit is in a position similar to FIG. 10 (after the now opened gripping jaws have been raised to the "up" position), the bulb transfer unit has moved to the right to place such now opened bulb-gripping jaws in registry with the bulbs being coated on the right-hand silica coating line, the jaws have descended into juxtaposition about such bulbs, secured such bulbs therein and moved upwardly to remove such coated bulbs from the coating heads on the right-hand silica-coating line; when the right-hand coating-nozzles are retracting; and when the left-hand coating nozzles are moving upwardly into the now rotating bulbs positioned on the coating heads on the left-hand silica-coating line.

Figure 16:
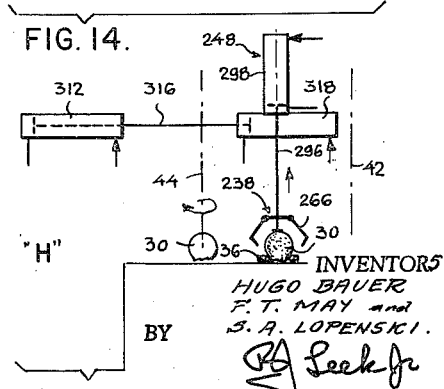

FIG. 16 is a view similar to FIGS. 9 through 15 and showing the position of the parts at time H in FIG. 21 when the bulb-transfer unit is in a position similar to FIGS. 9, 12 and 13 (after it has moved to the left to align the coated bulbs removed from the right-hand silica-coating line with the indexable conveyor), the bulb-gripping jaws have moved downwardly to deposit such bulbs therein, and the bulb-gripping jaws have opened preparatory for their upward retraction to permit the indexing of the second group of coated bulbs on the indexable conveyor by such conveyor to the bulb transfer zone.

Figure 17:
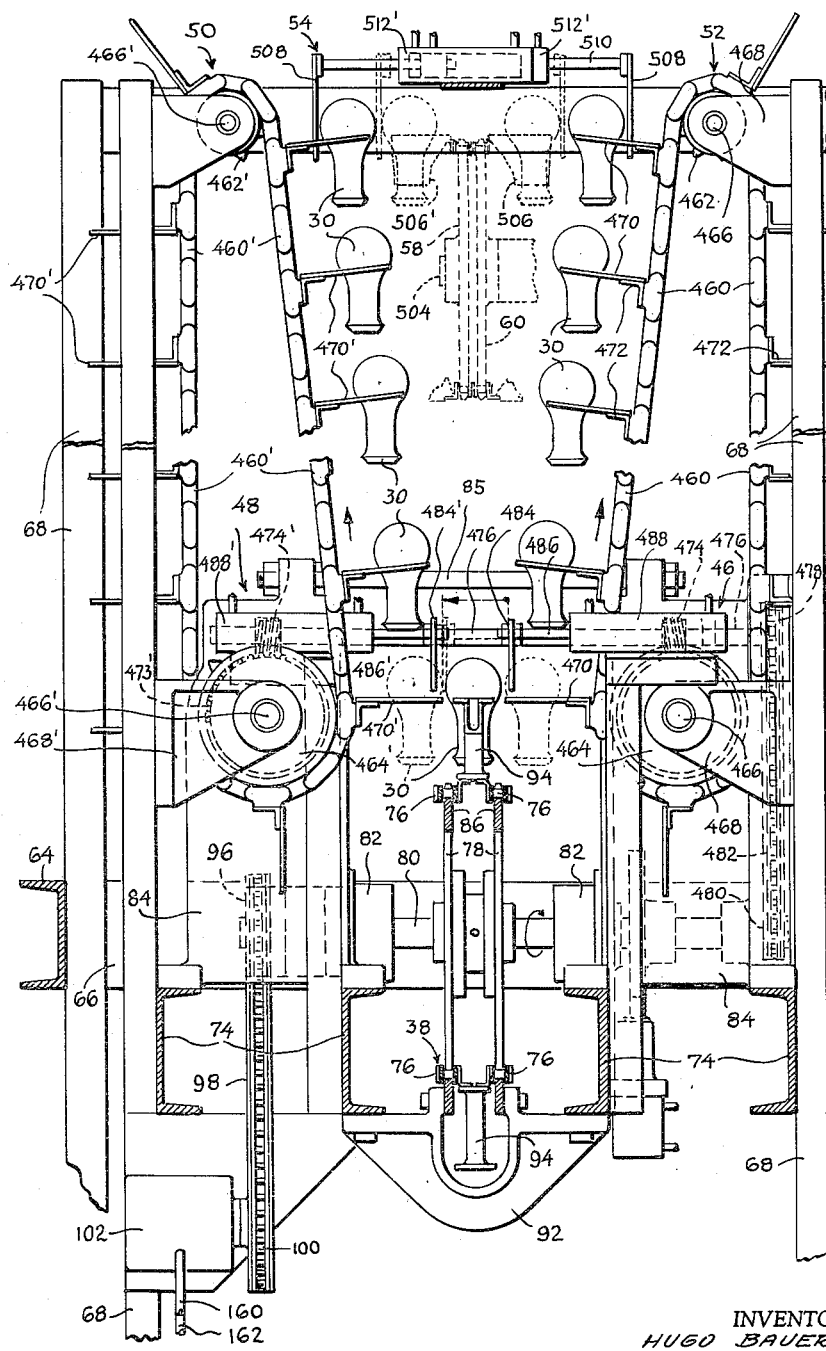

FIG. 17 is a vertical-sectional view (along the line XVII—XVII of FIG. 1) of the right and left-hand bulb-elevating mechanisms, the lower transfer devices for transferring the silica-coated bulbs from the indexable conveyor to such bulb-elevating mechanisms, the drive means for such bulb-elevating mechanisms, the indexing drive means for the indexable conveyor, the overhead conveyors to which the silica-coated bulbs are transferred and the upper transfer devices for transferring such coated bulbs from the bulb-elevating mechanisms to such overhead conveyors.

FIG. 18 is a diagrammatic plan view of the bulb-feeding apparatus, the silica-coating machine of the present invention, the bulb-elevating mechanisms the overhead conveyors and a bulb-lehring and sealing-in machine to which the silica-coated bulbs are transferred from the overhead conveyors.

FIG. 19 is a vertical-sectional view, partly diagrammatic of a cycle-control mechanism for the silica-coating machine of the present invention.

FIG. 20 is a diagrammatic side elevational view of the cycle-control mechanism shown in FIG. 19 and omitting for the sake of clarity the inlet and outlet lines for the four-way valves associated therewith.

FIG. 21 is a diagrammatic view illustrating the synchronized operation of the silica-coating machine.

Figure 22:
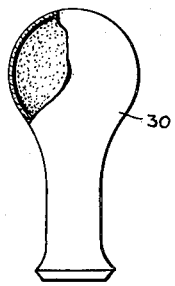

FIG. 22 is a side-elevational view of an incandescent-lamp bulb which has been silica coated on the silica-coating machine of the present invention and having a portion thereof broken away to show the silica coating of the interior thereof.

Figure 23:
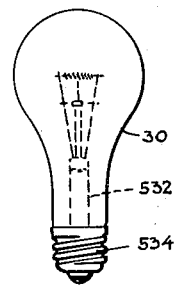

FIG. 23 is a side-elevational view of an incandescent lamp fabricated from a bulb which has been silica coated on the silica-coating machine of the present invention.

Although the principles of the invention are broadly applicable to automatic apparatus for fabricating successive groups of articles, the invention is particularly adapted for use in conjunction with apparatus for silica coating successive groups of incandescent-lamp bulbs and hence it has been so illustrated and will be so described.

Figure 1:
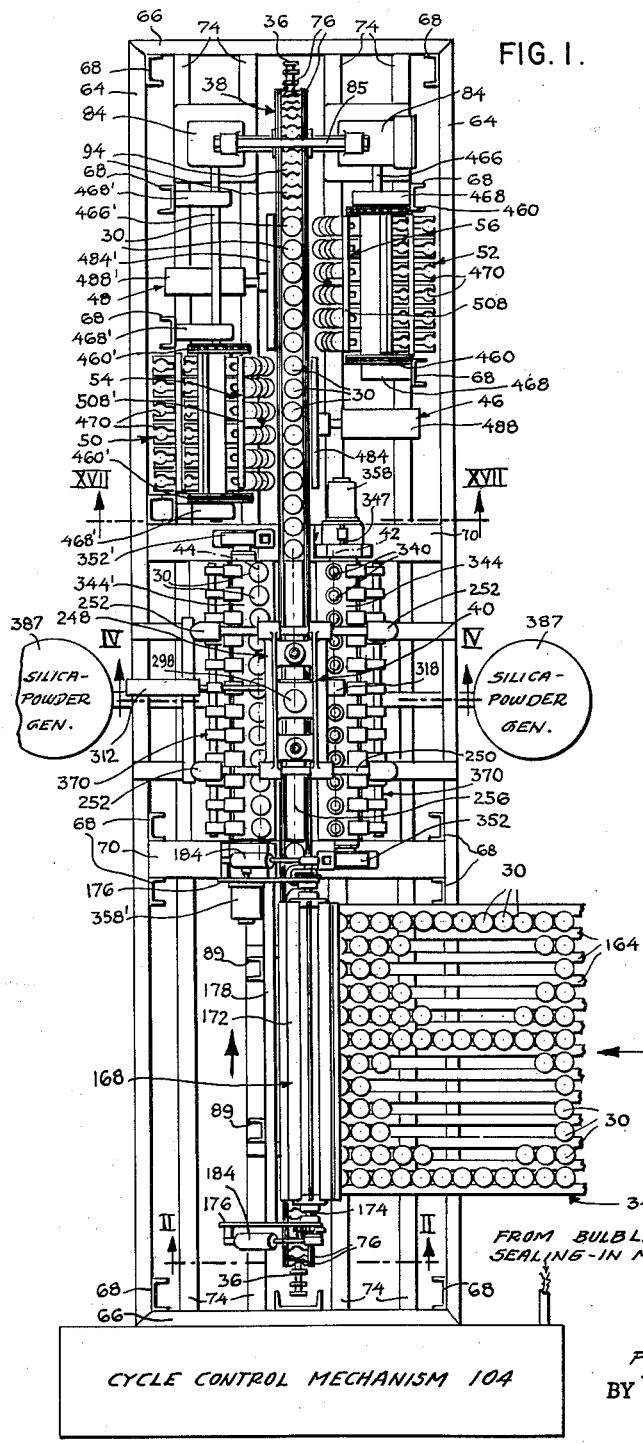
FIG. 1 is a plan view of the silica-coating machine of the present invention, the associated bulb-feeding apparatus and the bulb-elevating mechanism for receiving the silica-coated bulbs from the silica-coating machine and for positioning such bulbs adjacent over-head conveyors for delivery thereto.
Figure 2:
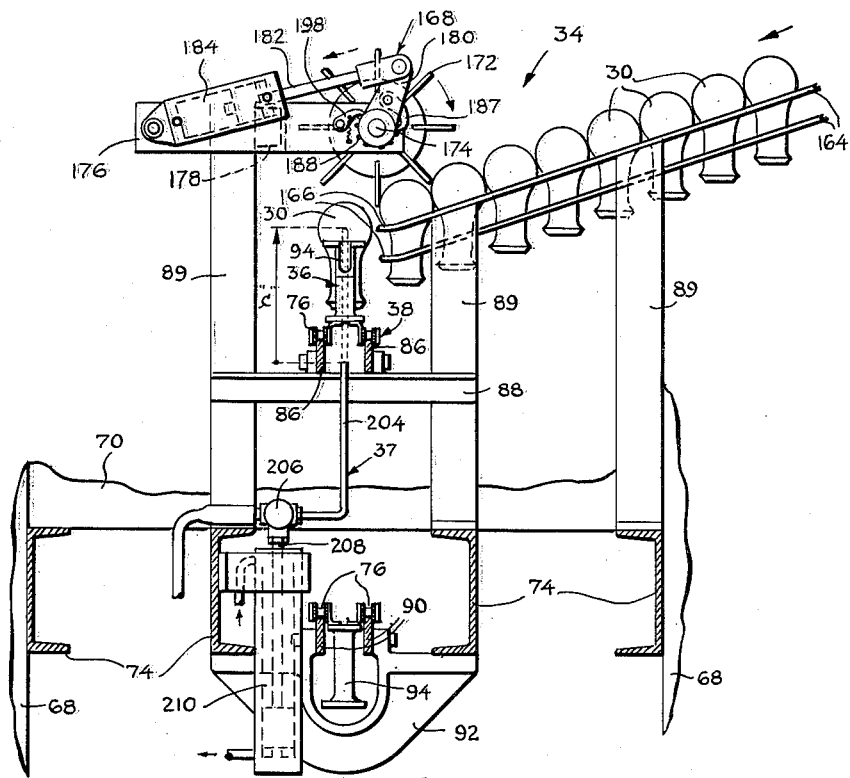
FIG. 2 is an enlarged vertical-sectional view of an indexable conveyor of the silica-coating machine, the bulb-feeding apparatus and one of the lint-cleaning devices, taken along the line II—II of FIG. 1 in the direction of the arrows.

With specific reference to the form of the invention illustrated in the drawings and, referring particularly to FIGS. 1 and 18, a silica-coating machine of the present invention for electrostatically coating successive groups of incandescent-lamp envelopes or bulbs 30 (FIGS. 2 and 3) is indicated generally by the reference numeral 32 (FIGS. 1 and 18). The uncoated bulbs 30 are fed, twelve at a time, by a bulb-feeding apparatus 34 (FIGS. 1, 2, 3 and 18) to a like number of heads 36 on an indexable conveyor 38 of the silica-coating machine 32 while such heads 36 are in a bulb-feeding and cleaning zone. In such zone a lint-cleaning device 37 (FIG. 2)

juxtaposed adjacent each head 36 is operative to pneumatically remove lint and other deleterious solid matter from the bulb 30. This indexable conveyor 38 then indexes the first group of twelve uncoated bulbs 30 from the bulb-feeding and cleaning zone to a silica-coating zone of the machine 32 adjacent a bulb-transfer unit 40 which transfers the group of uncoated bulbs 30 from the indexable conveyor 38 to (for example) a right-hand silica-coating line 42, as viewed in FIGS. 1 and 4, where the silica-coating operation will be performed. The bulb-transfer unit 40 then picks up a group of twelve silica-coated bulbs 30 which have been silica-coated on a left-hand silica-coating line 44, as viewed in FIGS. 1 and 4, and transfers such silica-coated bulbs 30 to the now empty heads 36 of the indexable conveyor 38 in the silica-coating zone. The indexable conveyor 38 then moves such group of silica-coated bulbs 30 from the silica-coating zone to a bulb-transfer zone where a lower right-hand transfer device 36 (as viewed in FIGS. 1, 17 and 18) and a lower left-hand transfer device 48 transfer the last six and the leading six silica-coated bulbs 30 respectively of such group to a left-hand bulb-elevating mechanism 50 and right-hand bulb elevating mechanism 52 respectively. These bulb-elevating mechanisms 50 and 52 move each sub-group of six silica-coated bulbs 30 upwardly, as viewed in FIG. 17, to a point adjacent left-hand and right-hand upper transfer devices 54 and 56 respectively, which upper transfer devices transfer such silica-coated bulbs 30 from the left-hand and right-hand bulb-elevating mechanism 50 and 52 respectively, to associated left-hand and right-hand upper conveyors 58 and 60, as viewed in FIG. 17. Each of these overhead conveyors 58 and 60 deliver silica-coated bulbs 30 to a transfer point adjacent an operating side of a duplex-type bulb-lehring and sealing-in machine 62 (FIG. 18) of the type shown in copending U. S. application, Serial No. 733,077, filed May 5, 1958, by W. J. Williams et al., and assigned to the same assignee as the present invention. At such transfer points the silica-coated bulbs 30 are transferred by means (not shown) to the bulb-lehring and sealing-in machine 62.

To provide a frame for the silica-coating machine 32, pairs of longitudinal channel members 64 (FIGS. 1, 4, 5 and 17) are integrated at their end portions by transverse channel members 66 (FIG. 1) and the box-like structure thus formed is supported by legs 68. Transverse channel members 70 bridge the mid-portions of the longitudinal channel members 64 and are connected to the end channel members 66 by longitudinal channel members 74 which in turn support the indexable conveyor 38.

*Indexable conveyor*

The indexable conveyor 38 (FIGS. 1, 2, 4, 5, 17 and 18) comprises a pair of endless movable members, suitably chains 76, which extend around and are supported by vertically disposed guide members, such as sprockets 78, mounted on driven and idler shafts 80 suitably journalled in bearings (not shown) affixed to the innermost longitudinal members 74 of the silica-coating machine 32. The driven shaft 80, shown in the upper portion of FIG. 1, is journalled in suitable bearings 82 (FIG. 17) provided in castings 84 secured to and upstanding from longitudinal channel members 74 and which castings 84 are connected at the top by a tie rod 85. For the purpose of supporting the chains 76 during their longitudinal movement from the bulb-feeding and cleaning zone through the bulb-transfer zone, such chains 76 ride on stationary upper tracks 86 mounted on a plurality of horizontal support members 88 (only one of which is shown in FIG. 2) affixed to vertical support members 89 (FIGS. 1, 2 and 3) upstanding from the longitudinal channel members 74. During the return movement of the chains 76 in the opposite direction, as viewed in FIG. 2, they are supported by similar tracks 90 mounted on bottom integrating brackets 92 (FIGS. 2 and 17). The aforementioned heads 36 which provide bulb-supporting means are formed by complementary split bulb-holders 94 mounted on the chains 76 with their bulb-supporting surfaces facing each other and are adapted to permit loading and unloading of the bulbs 30 from either side. The heads 36 are equi-spaced apart on the indexable conveyor 38 a distance hereinafter referred to as an index length.

For the purpose of indexing the indexable conveyor 38, fifteen index lengths at a time, from the bulb-feeding and cleaning zone (FIG. 18) to the silica-coating zone and thence to the bulb-transfer zone, an associated indexing mechanism is provided.

*Indexing mechanism*

In order to rotate the driven shaft 80 in clockwise direction, as viewed from the right-hand portion of FIG. 17, a sprocket 96 on the driven shaft 80 is connected by means of a chain 98 to a sprocket 100 on the drive shaft of a hydraulic motor 192 mounted on a leg 68. This hydraulic motor 102 is operable at times $T_1$ and $T_{1a}$ (FIG. 21) by energization of a cycle-control mechanism 104 (FIGS. 18, 19 and 20). Such mechanism 104 is in turn energized every six indexes of the bulb-lehring and sealing-in machine 62, by closure of an "energizing circuit" therefor, as hereinafter related.

*Cycle-control mechanism*

To cause closure of a normally open switch 112 (FIG. 18) in the "energizing circuit" for the cycle-control mechanism 104 every six indexes of the bulb-lehring and sealing-in machine 62 (or every 7.2 seconds), a motor driven mechanism 106 (FIG. 18) for the bulb-lehring and sealing-in machine 62 has a cam 108 on its drive shaft 110 operatively associated with such switch 112. This "energizing circuit" extends through a conductor 114 from one side of a suitable voltage supply, indicated by the legend "A.C. Supply," to one side of the switch 112, through a conductor 116 from the other side of the switch 112 to one end of the coil of an unlatching solenoid 118 (FIGS. 19 and 20) and through a conductor 120 from the other end of the coil of the unlatching solenoid 118 to the other side of the "A.C. Supply."

To provide drive means for a high-speed shaft 122 of the cycle-control mechanism 104 (which shaft 122 is suitably journalled in the frame portions of the silica-coating machine 32) such shaft 122 carries a pulley 124 (FIG. 20) which is connected by means of a belt 126 to a pulley 128 on the drive shaft of an electric motor 130. This electric motor 130 is mounted on an adjacent frame portion of the machine 32 and is continuously energized through conductors 132 and 134 (FIG. 19) which extend directly to the "A.C. Supply."

For the purpose of preventing rotation of the high-speed shaft 122 until six indexes of the bulb-lehring and sealing-in machine 62 have been accomplished, a one-revolution clutch 136 and associated latching cam 138 are secured to the high-speed shaft 122. A notch (FIG. 19) in the latching cam 138 is engageable by a latching lever 140 pivoted at 142 on the frame of the silica-coating machine 32. The lever 140 is connected by links 144 to an armature 146 of the unlatching solenoid 118.

When the "energizing circuit" for the cycle-control mechanism 104 is instantaneously and briefly energized upon closure of the switch 112 by the cam 108, the operating coil of the solenoid 118 is energized, thereby retracting the armature 146 upwardly, as viewed in FIGS. 19 and 20, thereby lifting the links 144 and the latching lever 140. Such movement of the latching lever 140 withdraws the end thereof from the aforesaid notch which releases the latching cam 138 on the high-speed shaft 122 and permits the electric motor 130 to slowly rotate the one-revolution clutch 136 and the high-speed shaft 122 (for one cycle i.e. <7.2 seconds and one revolution) in clockwise direction, as indicated, in FIGS. 19 and 20. At the end of one revolution of the high-speed shaft 122 the end of latching lever 140 engages the notch (FIG. 19) in the latching cam 138 and the high-speed shaft 122 ceases to rotate.

To provide a control device 151 (FIGS. 19 and 20) for the oil flow to the hydraulic motor 102, rotation of the high-speed shaft 122 causes a cam 152 carried thereby (FIGS. 19 and 20) to depress a spring-biased plunger 154 of a four-way valve 156 (also designated "1" in FIG. 20) which causes oil to flow through an inlet line 158 from the oil supply (not shown) through the valve 156 and thence through an oil line 160 (FIGS. 19 and 20) to the hydraulic motor 102 (FIG. 17). This flow of oil causes clockwise rotation of the drive shaft of such hydraulic motor 102, as viewed in FIG. 17, with resultant rotation of shaft 80 and movement of the indexable conveyor 38, fifteen index lengths from, for example, the bulb-feeding and cleaning zone to the silica-coating zone. To permit the return of the oil from the hydraulic motor 102, an oil line 162 (FIG. 17) connects an outlet of the hydraulic motor 102 to the valve 156 and an oil line 163 joins the valve 156 to the oil supply (not shown).

After the indexable conveyor 38 has been indexed fifteen index lengths during time period $T_1$–$T_2$ or $T_{1a}$–$T_{2a}$ (FIG. 21), a group of twelve empty bulb-supporting heads 36 are presented to the bulb-feeding and cleaning zone (FIG. 18).

*Bulb-feeding apparatus*

The bulb-feeding apparatus 34 (FIGS. 1, 2, 3 and 18) comprises a plurality of thirteen pairs of suitably supported and downwardly inclined rails 164 adapted to form twelve lanes for supporting the uncoated bulbs 30 in the neck-down position shown in FIG. 2 and to deliver them twelve at a time (in bowl-to-bowl abutting engagement) to upwardly inclined delivery lips 166 on the delivery end of such rails 164. The delivery lips 166 are disposed adjacent the twelve empty heads 36 in the bulb-feeding and cleaning zone and are contiguous to a star-wheel delivery mechanism 168. This star wheel delivery mechanism 168 is adapted to engage the twelve leading uncoated bulbs 30 on the delivery lips 166 of the rails 164 and to push such leading uncoated bulbs 30 upwardly off the delivery lips 166 so that the raised neck portions of the bulbs 30 pass through the space between the split bulb-holder portions 94 of each adjacent head 36 and so that the uncoated bulbs 30 then drop downwardly to seat themselves in such heads 36.

It will be understood that the inclined rails 164 may be loaded by hand or automatically from an inclined bulb hopper 170 (FIG. 18) mounted on a vibrating platform (not shown), which hopper urges the mass of uncoated bulbs 30 therewithin toward the twelve lanes formed by the rails 164 and which lanes are of such width as to permit uncoated bulbs 30, presented thereto in the neck-up position, to fall through.

The star wheel delivery mechanism 168 comprises an eight-vaned star wheel 172 (FIGS. 1, 2 and 3), which is affixed to a shaft 174 journalled in bearings mounted on transverse plates 176 secured to an upper horizontal channel 178 forming part of the mechanisms framework.

The star-wheel delivery mechanism 168 is driven by means, such as an operating lever 180 (FIGS. 2 and 3) rotatable on each end of the shaft 174. Each of the levers 180 is pivotably connected to an operating piston rod 182 of an oil cylinder 184, the latter of which is in turn pivoted to the transverse plate 176. For the purpose of connecting such drive means to the shaft 174 itself, an advancing pawl 187 pivoted on each of the operating levers 180 is spring biased into engagement with an adjacent ratchet wheel 188 on the shaft 174. An oil-flow control device 190 (FIG. 20) is provided for these oil cylinders 184 comprising a four-way valve "2," FIG. 20 (similar to the valve 156 and which is connected to the oil cylinders 184 by suitable lines, with such valve "2" being operable by a cam on the high-speed shaft 122 in the same manner as previously described relative to the valve "1."

For the purpose of preventing retracting counterclockwise movement of the star wheel 172, as viewed in FIG. 2, during retraction of the operating piston rod 182 of the oil cylinder 184, an arresting pawl 198 is pivotably mounted on each of the transverse members 176 and is spring-biased into engagement with the ratchet wheel 188 affixed to the shaft 174.

Figure 3:
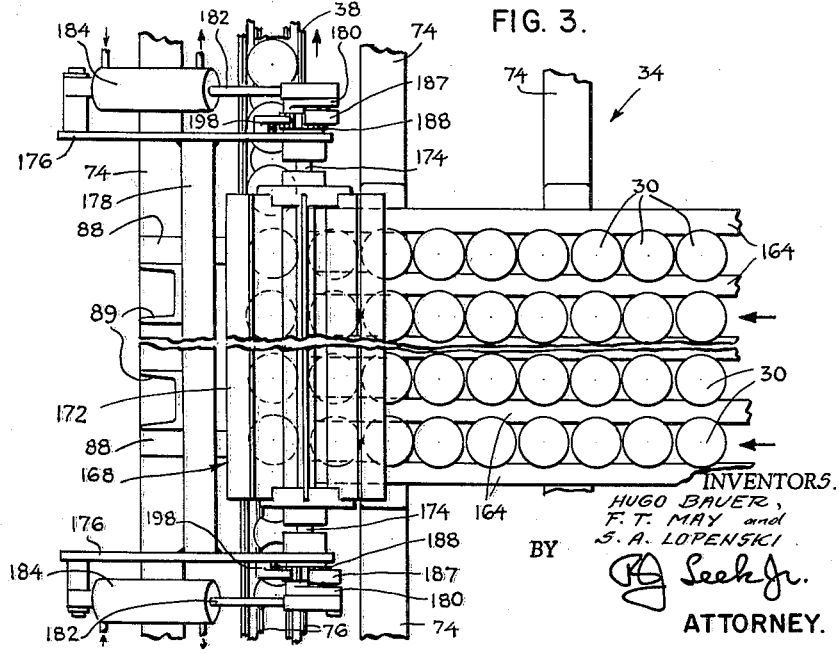
FIG. 3 is a plan view of the indexable conveyor and the bulb-feeding apparatus, shown in FIG. 2 and broken away because of its length to consolidate the figure.

Thus, when the electric motor 130 (FIGS. 19 and 20) rotates the high-speed shaft 122 in clockwise direction (upon release of the latching cam 138 by the latching lever 140) during times $T_3$–$T_4$ and $T_{3a}$–$T_{4a}$ (FIG. 21), oil flows into the left-hand end of the oil cylinders 184 (FIGS. 2 and 3). This movement of the oil causes the operating piston rod 182 of each of the oil cylinders 184 to move from left to right, as viewed in FIGS. 2 and 3 with attendant clockwise rotation of the operating levers 180, the advancing pawls 187 and hence the star wheel 172 through a 45° angle. This clockwise rotation of the star wheel 172 moves the twelve leading uncoated bulbs 30 on the delivery lips 166 of each pair of rails 164 into the heads 36 on the indexable conveyor 38. During such clockwise movement the spring-biased arresting pawls 198 slide off the teeth of the rotating ratchet wheels 188 and do not interfere with the rotation of the star wheel 172.

At times $T_4$ and $T_{4a}$ (FIG. 21) the above-described flow of oil to the oil cylinders 184 is reversed by operation of the control device 190 with attendant movement of the operating piston rods 182 from right to left, as viewed in FIG. 2. This movement of the operating piston 182 retracts the operating levers 180 counterclockwise, as viewed in FIG. 2, but the arresting pawls 198 prevent counterclockwise rotation of the star wheel 172.

After the twelve uncoated bulbs 30 have been deposited in the heads 36 in the bulb-feeding and cleaning zone (FIG. 18), twelve lint-cleaning devices 37 are moved into such uncoated bulbs 30 and are operable to release a blast of high-pressure air into each of such uncoated bulbs 30 to remove dust or other deleterious solid particles therefrom.

*Lint-cleaning devices*

Each lint-cleaning device 37 (FIG. 2) is provided with air-delivery means comprising a nozzle 204 which projects upwardly from an air manifold 206 in registry with an uncoated bulb 30 seated in a head 36 thereabove. So that each of the twelve nozzles 204 may be reciprocated into and out of a respective uncoated bulb 30, the air manifold 206 carrying such nozzles is mounted on the operating piston rod 208 of an oil cylinder 210 which is secured to the frame work of the apparatus. Suitable oil lines connect this oil cylinder 210 (FIG. 2) to another four-way valve "3" (FIG. 20) of an oil-control device 214 (similar to control device 151) and which is also operable by a cam on the high-speed shaft 122.

During the periods of time $T_5$–$T_6$ and $T_{5a}$–$T_{6a}$ (FIG. 21) oil flows into the bottom of the oil cylinder 210, as viewed in FIG. 2, with attendant upward movement of the operating piston rod 208 and the attached lint-cleaning devices 57 a distance "C" (FIG. 2), from the solid-line position shown therein to the upper or dotted-line position. Throughout the periods $T_6$–$T_7$ and $T_{6a}$–$T_{7a}$ an air valve "V" of an air-flow control device 232 (which valve is operable by a cam, FIG. 20, on the high-speed shaft 122) causes high-pressure air from a high-pressure air supply (not shown) to pass through the air valve "V" and a suitable air line (FIGS. 2 and 20) through the air manifold 206, and the nozzles 204 then disposed interiorly of the bulb 30, to remove lint, dust and other deleterious solid material from the first group of such uncoated bulbs 30 seated in the heads 36 in the bulb-feeding and cleaning zone (FIG. 18).

When the flow of oil is reversed through the four-way valve "3" by operation of the control device 214 during the times $T_7$–$T_8$ and $T_{7a}$–$T_{8a}$ (FIG. 21), the lint-cleaning devices 37 are retracted from the dotted-line position interiorly of the bulbs 30 to the solid-line position shown in FIG. 2.

After the indexing mechanism for the indexable conveyor 38 indexes the twelve now loaded heads 36 from the bulb-feeding and cleaning zone to the silica-coating zone (FIG. 18) and into registry with twelve bulb pickup heads 238 of the bulb-transfer unit 40 (FIGS. 1, 4, 5 and 18), which heads 238 are in the "center-up" position shown in FIGS. 9 and 10, the bulb-transfer unit 40 will then transfer (as shown in FIGS. 9 and 10) such group of twelve uncoated bulbs 30 to the right-hand silica-coating line 42, as viewed in FIG. 1, and the above-described bulb-feeding cycle is repeated.

*Bulb-transfer unit*

The above-noted bulb-transfer unit 40 (FIGS. 1, 4, 5 and 18) includes a carriage 248, such as a casting or the like, which is supported for horizontal reciprocating movement between the silica-coating lines 42 and 44 and the centrally located indexable conveyor 38 upon guide means comprising a pair of guide rods 250, shown in FIG. 5, having their ends supported by mount rods 234 upstanding from the longitudinal channel members 64 of the frame of the silica-coating machine 32.

The carriage 248 has a guide support for twelve bulb-pick-up heads 238 of the bulb-transfer unit 40 comprising a hollow mounting bar 256 (FIGS. 1, 4 and 5) affixed to a pair of vertical guide rods 258 which are reciprocable in bridge portions 260 of such carriage 248. The mounting bar 256 is in turn provided with twelve vertical shafts 262 (FIGS. 4, 7 and 8) journalled in bearings 264 (FIG. 4) depending from the mounting bar 256, each of which carry a bulb pick-up head 238. Each bulb pick-up head 238 has three bulb-gripping jaws 266, which are pivoted at 268 (FIGS. 4 and 8) on each of the bearings 264 and are spring-biased to the normally closed position shown in FIG. 4. In order to open the bulb-gripping jaws 266 to pick up and release bulbs 30, an operating mechanism, as now described, is provided.

*Operating mechanism for bulb-gripping jaws*

Figure 4:
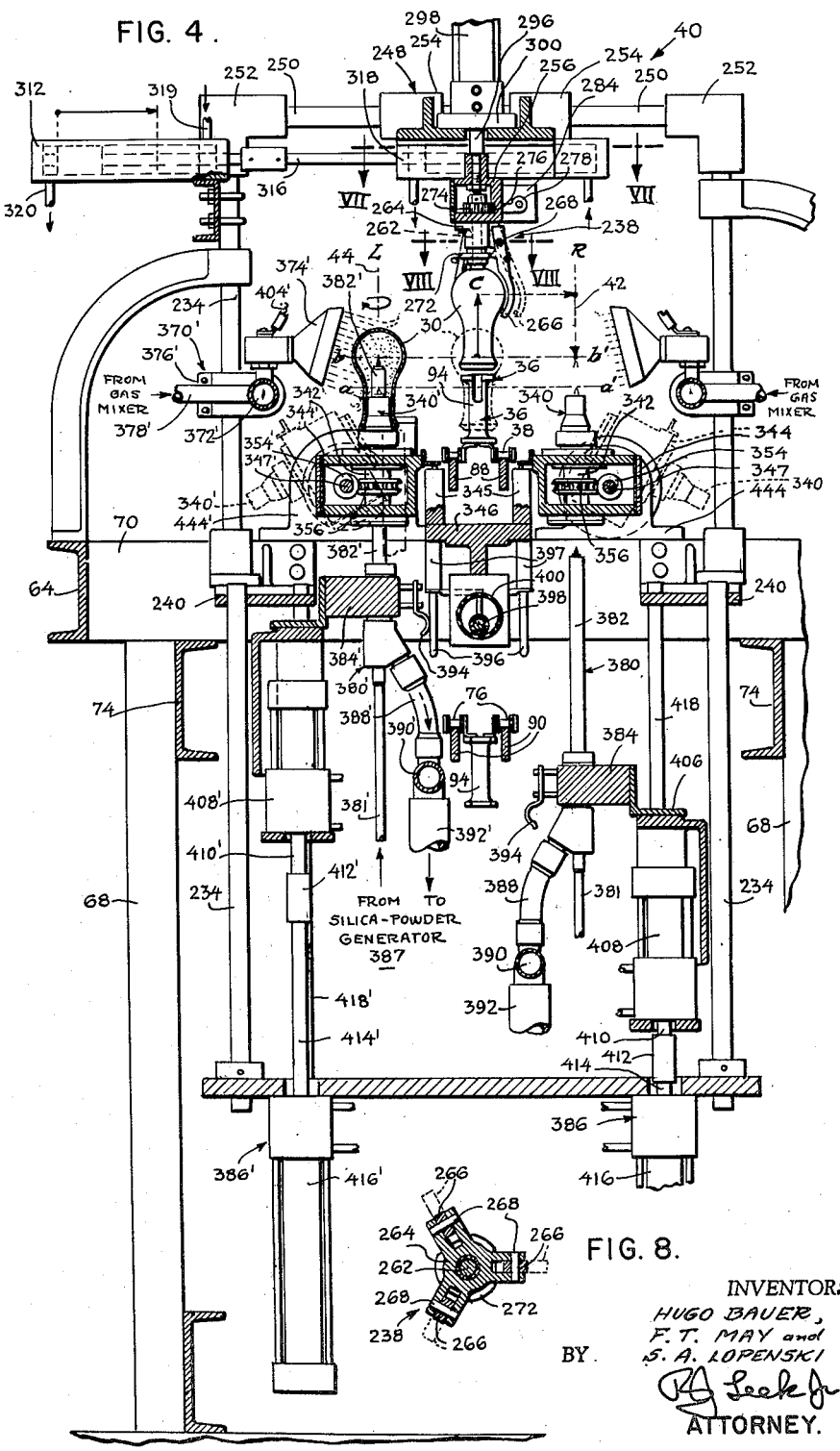
FIG. 4 is a vertical-sectional view of the silica-coating apparatus along the line IV—IV of FIG. 1 in the direction of the arrows and showing a bulb-transfer unit; a coating head on the right and left-hand coating lines; the associated preheating burners, tilting mechanisms and the rotating mechanisms for the coating heads and the reciprocating mechanisms for the coating nozzles.
Figure 8:
FIG. 8 is a horizontal-sectional view of the operating mechanism for the bulb-gripping jaws, taken along the line VIII—VIII of FIG. 4 in the direction of the arrows.

Referring now more particularly to FIGS. 4 and 8, a tit is therein shown on each of the bulb-gripping jaws 266 which due to the spring biasing of jaws 266 is forced into engagement with an operating cam 272 of the operating mechanism for the bulb-gripping jaws 266, which cam is (FIGS. 4 and 8) secured to shaft 262. Drive means for the operating cam 272 is provided by a pinion 274 (FIGS. 4 and 7) affixed to the upper portion of each shaft 262 and each pinion 274 is simultaneously engageable with a longitudinal rack 276 (FIG. 7) slidable along the right-hand side wall interiorly of the mounting bar 256. As shown in FIG. 7, an operating arm 278 projects from the slidable rack 276 through a slot in the side wall of the mounting bar 256 and is connected to an operating piston rod 282 of an oil cylinder 284 affixed to the mounting bar 256.

The oil cylinder 284 is connected by suitable oil lines (FIGS. 7 and 20) to a four-way oil valve "4" (FIG. 20) of an oil-flow control device 286 (similar to control device 151) which thus provides a drive means for such oil cylinder 284. This valve "4" is operable by a cam on the high-speed shaft 122 similar to the cams which operate the previously mentioned valves and during the periods of time $T_9$–$T_{10}$, $T_{11}$–$T_{12}$, $T_{9a}$–$T_{10a}$ and $T_{11a}$–$T_{12a}$ (FIG. 21) such valve "4" opens to allow oil to flow into the upper end of the oil cylinder 284, as viewed in FIG. 7. Such flow of oil moves the operating piston rod 282, the arm 278 and the slidable rack 276 in the direction of the arrows shown in FIG. 7, with attendant clockwise rotation of the pinions 274 and the operating cam 272 on each of the shafts 262. Such clockwise movement of the operating cams 272 causes a raised surface thereof to engage the tits on the bulb-gripping jaws 266 which thus causes such jaws 266 to pivot outwardly against the action of the spring biasing, from their solid-line or bulb-gripping position shown in FIG. 4 to the dotted-line position shown therein and indicated in FIG. 8.

After the bulb-gripping jaws 266 are opened by the above-described operating mechanism at time $T_9$ (FIG. 21) for example, (and while the bulb pick-up heads 238 are immediately above the conveyor heads 36, which will hereinafter be referred to as the "center-up" position as shown diagrammatically in FIG. 13), the pick-up heads 238 with their now opened bulb-gripping jaws 266 are lowered during the time $T_{13}$–$T_{14}$ (FIG. 21) by a vertical reciprocating mechanism as now described.

*Vertical reciprocating mechanism for bulb pick-up heads*

The above-mentioned vertical reciprocating mechanism (FIGS. 1, 4 and 5) for the mounting bar 256 and the associated pick-up heads 238 of the bulb-transfer unit 40, comprises an operating piston rod 296 connected to the mounting bar 256 and which extends from an oil cylinder 298 mounted on the carriage 248 of the bulb-transfer unit 40. Such operating piston rod 296 passes through a suitable sleeve bearing carried by a center bridge portion 300 of the carriage 248. In order to operate the oil cylinder 298, oil lines (FIGS. 4 and 20) connect such oil cylinder 298 to a four-way oil valve "5" of an oil-flow control device 302 (similar to the control device 151) and which valve "5" is operable by a cam on the high-speed shaft 122. At time $T_{13}$, for example, (FIG. 21) oil flows into the upper end of the oil cylinder 298, as viewed in FIG. 4 which thus moves the operating piston rod 296, the mounting bar 256 affixed thereto and the now open bulb-gripping jaws 266 of the pick-up heads 238, downwardly from the "center-up" position shown in FIG. 13 to the "center-down" position shown in FIG. 16 where such jaws 266 are juxtaposed about the uncoated bulbs 30 seated in the heads 36 of the indexable conveyor 38 and are aligned therewith.

During the time $T_{14}$–$T_{15}$ (FIG. 21) the above-mentioned operating mechanism for the bulb-gripping jaws 266 causes them to close about the uncoated bulbs 30 preparatory for their upward removal from the heads 36 by the vertical reciprocating mechanism during the time $T_{15}$–$T_{16}$ (FIG. 21) to the "center-up" holding position shown in FIG. 9. From this "center-up" holding position (FIG. 9) such twelve loaded pick-up heads 238 are moved to a "right-up" position (FIG. 15) by a horizontal reciprocating mechanism for the carriage 248.

*Horizontal reciprocating mechanism for carriage*

In order to move the carriage 248 (FIGS. 1, 4 and 5) of the bulb-transfer unit 40 from the "center-up" holding position (FIG. 9) to a position above the silica-coating line hereinafter referred to as the "right-up" position (FIG. 15) and back again to the "center-up" position, a stationary oil cylinder 312 (FIGS. 1, 4 and 5) is mounted on the framework of the silica-coating machine. A common operating piston rod 316 interconnects this stationary oil cylinder 312 with a movable oil cylinder 318 secured to the mounting bar 256 (FIGS. 4 and 7) of the carriage 248. The movable oil cylinder is operable to move the carriage 248 from the "center-up" position to a position above the silica-coating line 36 hereinafter referred to as the "left-up" position, and vice versa. As shown in FIGS. 4, 19 and 20, oil lines 319 and 320 connect the stationary oil cylinder 312 with a four-way oil valve (indicated as "8" in FIG. 20) of an oil-flow control device 321 (similar to control device 151) having its spring biased operating plunger 322 operated by a cam 323 on a low-speed shaft 324.

This low-speed shaft 324 is driven at one half the speed of the high-speed shaft 122, namely ½ revolution per cycle, by a gear 325 (FIGS. 19 and 20) on the high-speed shaft 122 meshing with another gear 326 on the low-speed shaft 324. In like manner, as above described suitable oil lines connect the moving oil cylinder 318 (FIGS. 4 and 5) with another four-way oil valve "9" of a control device 330, which valve "9" is in operative engagement with a cam on the low-speed shaft 324.

Thus, at time $T_{16}$ (FIG. 21) oil from the supply (not shown) flows through the oil line 158 (FIG. 19), the valve 321 (FIGS. 19 and 20) and the oil line 320 into the left-hand end of the stationary cylinder 312, as viewed in FIGS. 4, 9 and 10) thereby moving the common operating piston rod 316, the carriage 248 and the twelve loaded pick-up heads 238 carried thereby from the "center-up" position, shown in FIG. 9, to the "right-up" position, shown in FIG. 15. Meanwhile, to prevent any movement of the common operating piston 316 with respect to the moving oil cylinder 318, the cam (associated with the control device 330 for the moving oil cylinder 318) maintains the operating plunger of the four-way oil valve "9" in a position to insure the passage of the oil through such valve "9" and the associated oil line into the right-hand end of such moving oil cylinder 318, as viewed in FIGS. 9 through 16, to maintain the right-hand end of the operating piston 316 in the position shown in FIGS. 9 and 10.

During the time $T_{17}-T_{18}$ (FIG. 21) the vertical reciprocating mechanism for the bulb pick-up heads 238 lowers such heads from the "right-up" position to the "right-down" position thereby placing each of the uncoated bulbs 30 "neck-down" on a bulb-coating head 340 (FIGS. 1, 4, 5, 9 through 16) on the right-hand silica-coating line 42. Whereupon the operating mechanism for the bulb-gripping jaws 266 causes them to open during the time $T_{18}-T_{11}$ (FIG. 21) to the position shown in FIG. 10 thereby releasing such uncoated bulbs 30 preparatory for the silica-coating operation which will be performed thereon by an associated silica-coating apparatus. The now-open bulb pick-up heads 238 are then moved upwardly out of the way to the "right-up" position during the time $T_{11}-T_{18a}$ (FIG. 21) by the vertical reciprocating mechanism for the bulb pick-up heads 238.

It is deemed advisable at this point to now consider the silica-coating operation to be performed on the twelve uncoated bulbs 30, which have been deposited on twelve coating heads 340 of the right-hand silica-coating line 42, as viewed in FIGS. 1 and 4, before completing the description of the operation of the bulb-transfer unit 40.

*Silica-coating apparatus*

Each of the twelve silica-coating heads 340 on the right silica-coating line 42 (shown in detail in FIGS. 1, 4 and 5 and indicated diagrammatically in FIGS. 9 through 16) has a hollow bulb holder contoured to fit inside the neck portion of a bulb 30 and adapted to support the bottom or cullet portion thereof. Each bulb holder is mounted on a hollow shaft 342 journalled in a generally elongated housing 344 forming a part of a tilting mechanism 352. This tilting mechanism 352, as hereinafter explained in detail, is operable to oscillate the housing 344 and the bulb holders carried thereby (at a predetermined time $T_{35}-T_{36}$, FIG. 21) between the coating position (the solid-line position shown in FIG. 4) and the cullet removal position (the dotted-line position shown therein).

To provide the proper vertical alignment of the coating heads 340 (while in the coating or solid-line position of FIG. 4) such housing 344 rests on adjustable vertical studs 345 which in turn are affixed to a horizontal plate 346 extending between the transverse frame channel members 70. The above-mentioned tilting mechanism 352 includes a longitudinal shaft 347 on which the elongated housing 344 is rotatable as a bearing. The shaft 347 also forms a part of a rotating mechanism for the twelve right-hand coating heads 340, which rotating mechanism is hereinafter explained in detail. Such longitudinal shaft 347 is itself rotatable in a bearing shown in the upper portion of FIG. 5 and in a bearing provided in the bottom closure portion of the elongated housing 344.

It will be understood from a consideration of FIG. 2 that the twelve coating heads 340 on the right-hand coating line 42, as viewed in FIGS. 1, 4 and 5, are rotated continuously at about 180 r.p.m. during the period $T_{19}-T_{20}$ (FIG. 21) by the aforesaid rotating mechanism, to effect uniform preheating of the vitreous bulbs 30 by a preheating mechanism 370 (FIGS. 1, 4 and 5) to a temperature of about 100° C. thereby overcoming the negative temperature coefficient of resistance of such bulbs and rendering the latter relatively electrically conductive. Such rotation also insures uniform silica-coating of the inside of the bulbs.

*Rotating mechanism for right-hand coating heads*

The above-mentioned longitudinal shaft 347 (FIGS. 4 and 5) carries a plurality of worms 354 (one for each coating head 340) each of which meshes with a worm gear 356 affixed to the hollow shaft 342 of each of the silica-coating heads 340 on the right-hand silica-coating line 42. To provide drive means for the longitudinal shaft 347, the drive shaft of a hydraulic motor 358 (FIG. 5) is coupled to the longitudinal shaft 347. For the purpose of operating the hydraulic motor 358, suitable oil lines (FIGS. 5 and 20) connect such hydraulic motor 358 with a four-way oil valve "10" of an oil-flow control device 364 (similar to the previously described control device 151) and likewise a spring-biased plunger of the valve "10" is in operable engagement with a cam on the low-speed shaft 324.

Thus, at time $T_{19}$ (FIG. 21) oil passes into the hydraulic motor 358 to cause the longitudinal shaft 347 and associated worms 354 carried thereby to rotate in clockwise direction about a horizontal axis, as viewed in FIG. 5. The meshing work gears 356 are rotated about a vertical axis with attendant similar movement of the hollow shaft 342 along with the coating head 340 carried thereby and the bulb 30 supported thereon.

As hereinbefore mentioned, these silica-coating heads 340 on the right-hand silica-coating line 42 rotate continuously during the period of time $T_{19}-T_{20}$ (FIG. 21) and each rotating uncoated bulb 30 on the right-hand silica-coating line, as viewed in FIGS. 1 and 4, is subjected to preheating by the above-mentioned preheating mechanism 370 during the period of time $T_{21}-T_{22}$ (FIG. 21) to render such bulbs relatively electrically conductive.

*Preheating mechanism*

The above-mentioned preheating mechanism 370 comprises a gas-air manifold 372 which supplies a gas-air mixture to a plurality of twelve stationary (but adjustable) radiant burners 374 (FIGS. 1, 4 and 5) with such manifold 372 being secured by brackets 376 to the mount rods 234 of the silica-coating machine frame. For the purpose of supplying the gas-air mixture to the manifold 372, a line 378 connects such manifold 372 to a gas-air mixer (not shown).

When the uncoated bulbs 30 have been raised to a temperature of about 100° C. and are relatively electrically conductive, a coating-nozzle assembly 380 (of the type shown in copending U.S. patent application, Serial No. 692,841, filed October 28, 1957 by George Meister et al., and assigned to the same assignee as the subject application and is aligned with the heads 340 of the coating line 42) is moved upwardly from the "down" position (or solid-line position, shown in FIG. 4) to the first coating-level (line $a-a'$ FIG. 4) inside the uncoated bulbs 30 then on the coating heads 340 of the right-hand coating line 42 during the period of time $T_{23}-T_{22}$ (FIG. 21).

*Coating-nozzle assembly*

Since the coating-nozzle assembly 380 is fully explained in the above-mentioned co-pending application, Serial No. 692,841, it is deemed sufficient to say that twelve coating nozzles 382 (FIG. 4) are mounted on a longitudinal bar 384 which in turn is secured to a reciprocating mechanism 386 for such coating nozzle assembly 380. To provide silica-smoke to the coating nozzles 382 (during the times $T_{22a}-T_{23a}$ and $T_{26a}-T_{27a}$, FIG. 21) a gaseous medium, such as air, carries the finely divided, light-scattering silica from a silica-powder generator 387, FIG. 1 (of the type shown in co-pending U.S. application, Serial No. 680,543, filed August 27, 1957, now U.S. Patent No. 2,884,895, by S. A. Lopenski et al., and assigned to the same assignee as the present application) through conduit means 381 to such nozzles 382. As indicated in FIG. 4a vacuum source (not shown) returns agglomerates and excess silica powder through a return tube 388 and into a collecting manifold 390, from whence such agglomerates and excess silica-powder are returned by means of a tube 392 to the silica-powder generator 387.

To apply either a pulsating or steady direct-current high-voltage potential of about 15 kilovolts (during the time $T_{21a}-T_{24a}$, FIG. 21) between the electrically conducting coating nozzles 382 and the radiant burners 374, one side of a high voltage D.C. potential is connected to the coating nozzles 382 and the other side to the radiant burners 374. To provide such connection during the upward movement of the coating nozzle assembly 380 in the silica-coating line 42 from the "down" position, shown in FIG. 4, to the first coating level (indicated by the line $a-a'$ in FIG. 4), spring-pressed contacts 394 carried by but insulated from the mounting bar 384 (and which are electrically connected to the coating nozzles 382) engage stationary contacts 396 mounted on insulating studs 397 depending from the above-mentioned horizontal plate 346. These stationary contacts 396 are connected by suitable conductors to a conductor 398 (FIG. 4) extending from one side of the high voltage D.C. potential (not shown), which conductor 398 is contained in a housing 400 secured to the underside of the horizontal plate 346. The other side of the high-voltage D.C. supply potential is connected by means of a further conductor 404 (FIG. 4) to the radiant burners 374 and is grounded to minimize shock hazards.

The silica-coating nozzle assembly 380 of the coating line 42 is moved from the "down" position shown in FIG. 4 to the first coating level (indicated by line $a-a'$) as above stated during the period of time $T_{23}-T_{22}$ (FIG. 21) by the previously mentioned reciprocating mechanism 386 which is similar in structure and operation to the horizontal reciprocating mechanism for the bulb-transfer unit 40.

*Reciprocating mechanism for silica-coating nozzle assembly*

As shown in FIG. 4 the mounting bar 384 is secured by a bracket 406 to a movable oil cylinder 408 having its operating piston rod 410 coupled at 412 to an operating piston rod 414 of a stationary oil cylinder 416 secured to the longitudinal mounting plate 246 of the machine frame. To provide guide means for the movable oil cylinder 408 during its vertical reciprocating movement, such oil cylinder 408 is slidable on guide rods 418 disposed between the framework plates 240 and 246 of the machine.

Throughout the period of time $T_{23}-T_{22}$ a cam on the low-speed shaft 324 operates a four-way oil valve "11" (FIG. 20) of an oil-flow control device 424 (similar to control device 151) so that oil flows through such valve "11" and through an oil line (FIGS. 4 and 20) into the bottom of the stationary oil cylinder 416 thereby moving the operating piston rod 414 upwardly (as viewed in FIG. 4) with attendant movement of the movable oil cylinder 408 along the guide rods 418, which also moves all twelve coating nozzles 382 carried by the bar 384 from the "down" position shown in FIG. 4 to the first coating level indicated by the line $a-a'$.

During this upward movement of each coating-nozzle assembly 380, the spring-pressed contacts 394 of each assembly engages the stationary contacts 396 so that from time $T_{21a}$ to time $T_{24a}$ (FIG. 21) the high voltage D.C. potential is applied. The finely-divided, light-scattering silica powder is coated on the interior of the twelve bulbs 30 on the silica-coating heads 340 of the coating line 42 while such heads 340 are at the first coating level (line $a-a'$, FIG. 4) throughout the period of time $T_{22a}-T_{23a}$ (FIG. 21).

In order to insure an adequate adherence of the electrostatically deposited uniform coating on the interior of the bulbs 30, the coating nozzles 382 are then moved from the first coating level (line $a-a'$, FIG. 4) to a second coating level within such bulbs 30 (line $b-b'$, FIG. 4) during the period of time $T_{25}-T_{26}$ by operation of the moving oil cylinder 408. During such travel the continued application of the high voltage D.C. potential applies a follow-up electrostatic field between the rotating bulb 30 and the coating nozzles 382, which field increases the bulk density of the coating, thereby improving its adherence to the bulb 30. At time $T_{25}$ (FIG. 21) a cam on the low-speed shaft 324 (FIG. 20) operates a four-way oil valve "12" of an oil-flow control device 432 (similar to control device 151) to cause oil to flow into the top portion, as viewed in FIG. 4, of the moving oil cylinder 408. This flow of oil elevates such moving oil cylinder 408 (still higher on the guide rods 418) with respect to its operating piston rod 410 with attendant movement of the coating nozzles 382 from the first coating level indicated by the line $a-a'$ (FIG. 4) to the second coating level line $b-b'$, FIG. 4, where throughout the time $T_{26a}-T_{27a}$ (FIG. 21), the follow-up electrostatic field is applied to the bulbs 30.

At time $T_{24}$ (FIG. 21) the oil-flow control device 432 reverses the flow of oil through such valve "12" which then flows into the bottom portion, as viewed in FIG. 4, of the movable oil cylinder 408. Simultaneously, the control device 424 (associated with the stationary oil cylinder 416) causes a similar reversal of the flow of oil thereby permitting oil to flow into the top, as viewed in FIG. 4, of the stationary oil cylinder 416. The simultaneous operation of the control device 432 and the control device 424 causes continuous downward movement of the silica-coating assembly 380 from the second coating level (line $b-b'$, FIG. 4) to the "down" position shown in FIG. 4, which "down" position is achieved at time $T_{28}$ (FIG. 21).

After the transfer unit 40 removes the bulbs 30 which have been silica-coated on the right-hand coating line 42, as hereinafter explained in detail, the tilting mechanism 352 for such coating line 42 is operative during the period $T_{35}-T_{36}$ (FIG. 21) to rotate the elongated housing 344 and the coating heads 340 carried thereby so that any cullet which remains on such heads is removed by gravity.

*Tilting mechanism for coating heads of silica-coating line*

Since the tilting mechanism 352 for the coating heads 340 of line 42 is identical to a tilting mechanism 352' for the coating heads 340' of the line 44 and FIG. 6 (showing the details of the operation of the tilting mechanism) is a vertical sectional view of the tilting mechanism 352', the tilting mechanism 352' will be described in detail.

This tilting mechanism 352' (FIGS. 4, 5 and 6) for the coating heads 340 of line 44, has a pinion 440' (FIGS. 5 and 6) on a stud shaft 350' which is affixed to the upper end, as viewed in FIG. 5, of the housing 344'. To provide drive means for the gear 440', a rack 442' meshes with the gear 440' and is reciprocable in a suitable guide in a casting 444' on the transverse channel member 70 upon the operation of a piston rod 446' of an oil cylinder 448'.

During the period $T_{35}'-T_{36}'$ (FIG. 21) an oil-flow control device 450, FIG. 20, (similar to the control device 151) causes oil to flow through a four-way oil valve "13" and into the bottom of the oil cylinder 448′, as viewed in FIG. 6. This flow of oil causes upward movement of the rack 442′ and resultant counterclockwise rotation (as viewed in FIG. 6) of the gear 440′, stud shaft 350′, the hollow housing 344′ affixed thereto and particularly the coating heads 340′ on the housing 344′ from their full-line position shown in FIG. 4 through an angle >90° to the cullet-disposal position shown by the dotted lines in FIG. 4 where any broken cullet slides off the coating heads 340′ by gravity. During the time $T_{37'}-T_{38'}$ the control device 450 reverses the flow of oil through the four-way oil valve "13" to cause such oil to flow into the top of the oil cylinder 448′ thereby retracting the bulb-coating heads 340′ in clockwise direction, as shown in FIG. 4, to their full-line bulb-coating position shown therein.

Having described the silica-coating operation on the silica-coating line 42, it is now deemed advisable to resume the description of the operation of the bulb-transfer unit 40, which has continued to function during such silica, coating operation. When last above mentioned the bulb-transfer unit 40 had been raised, it will be remembered, during the time $T_{11}-T_{18}$ (FIG. 21) to the "right-up" position with the bulb-gripping jaws 266 in the "open" position.

*Continued operation of the bulb-transfer unit*

In order to move the carriage 248 of the bulb-transfer unit 40 from the "right-up" position to the "center-up" position, the control device 321, FIG. 20 (associated with the stationary oil cylinder 312) causes reversal of the oil flow through the oil valve "8," and into the right-hand end of the stationary oil cylinder 312, as viewed in FIGS. 9 through 16, with attendant movement of the common operating piston rod 316 from right to left to the position shown in FIG. 11, during the time $T_{30}-T_{31}$ (FIG. 21). Simultaneously, with this movement of the common operating piston rod 316, the control device 330 causes similar reversal of the oil flow through the four-way oil valve "9" (associated with the moving oil cylinder 318) so that oil now flows into the left-hand end of the moving oil cylinder 318, utilized to move the carriage from the "center-up" position to the "left-up" position. Such oil flow moves the movable oil cylinder 318 from right to left with respect to the common operating piston rod 316 with resultant movement of the carriage 248 from the "center-up" position to the "left-up" position. Since, as indicated in FIG. 21, both oil cylinders are operable at the same time $T_{30}-T_{31}$, the movement of the carriage 248 from the "right-up" position to the "left-up" position is continuous.

During the period of time $T_{31}-T_{32}$ the vertical reciprocating mechanism for the bulb-gripping jaws 266 moves the still open gripping jaws 266 downwardly from the "left-up" position to the "left-down" position to juxtapose such bulb-gripping jaws 266 about the bulbs 30 which have been silica-coated on the silica-coating line 44. The operating mechanism for the bulb-gripping jaws 266 causes closure of such jaws about the silica-coated bulbs 30 during the time $T_{32}-T_{33}$ (FIG. 21) and the vertical reciprocating mechanism for the bulb pick-up heads moves such now loaded bulb pick-up heads from the "left-down" position to the "left-up" position (shown in FIG. 11) during time $T_{33}-T_{34}$.

Since the silica-coating line 44, as viewed in FIGS. 1 and 4, (from which coated bulbs 30 have been removed by the bulb-transfer unit 40) is identical in structure and in operation to the hereinbefore described silica-coating line 42 except for the direction of its movement and the period of operation, it is deemed sufficient to say that the rotating mechanism 358′ for the coating heads 340′ was operative during the period $T_{19'}-T_{20'}$ (FIG. 21); that the rotating bulbs 30 were preheated during the period of time $T_{21'}-T_{22'}$ by a preheating mechanism 370′; and that the high voltage D.C. supply for the silica-coating heads 340′ of the line 44 was "on" during the period $T_{21a'}-T_{24a'}$. The vertical reciprocating mechanism 386′ for the coating-nozzle assemblies of the line 44 elevated such assemblies 380′ to the first coating-level (line a—a′, FIG. 4) during the time $T_{23'}-T_{22'}$ and the first coating operation was performed during the period $T_{22a'}-T_{23a'}$. During the period $T_{25'}-T_{26'}$ the coating nozzles 382 were raised to the second coating level (line b—b′, FIG. 4) and the follow-up electrostatic field applied to bulbs during the period $T_{26a'}-T_{27a'}$. From $T_{24'}$ to $T_{28'}$ the coating nozzles 382′ of the line 44 were retracted downwardly from the second coating level (line b—b′, FIG. 4) to the "down" position corresponding to the position of the coating nozzles 382 of the line 42, shown in FIG. 4, preparatory to the tilting of the silica-coating heads 340′ on the coating line 44 from the position shown in FIG. 11 to the cullet disposal position, shown in FIG. 12, by the tilting mechanism 352′ for such coating heads 340′ during the period $T_{35'}-T_{36'}$ (FIG. 21).

Referring again to the bulb-transfer unit 40, it will be remembered that when the bulb-transfer unit was last referred to, the vertical reciprocating mechanism for the bulb pick-up heads had moved such pick-up heads loaded with silica coated bulbs 30 (removed thereby from the silica-coating line 44) to the "left-up" position shown in FIG. 11 (during the period $T_{32}-T_{33}$, FIG. 21).

In order to move the carriage 248 and hence the loaded bulb pick-up heads 238 from the "left-up" position (FIG. 11) to the "center-up" position (FIG. 9), the control device 330 under operation of its associated cam (FIG. 20) causes oil to flow into the right-hand end of the moving oil cylinder 318, as viewed in FIG. 11, with attendant movement of said moving oil cylinder 318 on the common operating piston rod 316 to the right during the period of time $T_{34}-T_{39}$ (FIG. 21). From time period $T_{39}-T_{40}$ the vertical reciprocating mechanism for the bulb pick-up heads 238 lowers such heads from the "center-up" position of FIG. 9 to the "center-down" position thereby depositing the silica-coated bulbs 39 on the heads 36 of the indexable conveyor 38. The operating mechanism for the bulb-gripping jaws 266 then opens such jaws during the period $T_{40}-T_{9a}$. At time $T_{9a}$ through $T_{41}$ the vertical reciprocating mechanism for the bulb pick-up heads moves the now open and empty pick-up heads 238 from the "center-down" position, shown in FIG. 12, to the "center-up" position, shown in FIG. 13, preparatory for the indexing of such indexable conveyor 38 and the twelve bulbs 30 coated on the silica-coating line 44 to the bulb-transfer zone (FIG. 18) adjacent the bulb-elevating mechanism 50 and 52, and the indexing of a second group of uncoated bulbs 30 into the silica-coating zone.

During the time $T_{42}-T_{10a'}$ (FIG. 21) the vertical reciprocating mechanism for the bulb pick-up heads 238 lowers such heads from the "center-up" position (FIG. 13) to the "center-down" position to juxtapose the now open bulb-gripping jaws 266 about the second group of uncoated bulbs 30 on the heads 36 of the indexable conveyor 38. The operating mechanism for the bulb-gripping jaws 266 closes such jaws about the second group of uncoated bulbs 30 during the period $T_{10a}-T_{43}$ and the vertical reciprocating mechanism for the bulb pick-up heads 238 moves such now loaded heads from the "center-down" position to the "center-up" position, shown in FIG. 9, during the period $T_{44}-T_{45}$. At time $T_{45}-T_{46}$ the moving oil cylinder 318 (and hence the carriage 248 and the loaded pick-up heads) are moved from the "center-up" position to the "left-up" position by operation of the moving oil cylinder 318, whereupon the vertical reciprocating mechanism for the bulb-pick-up heads 238 lowers such heads during the period $T_{47}-T_{48}$ from the "left-up" position to the "left-down" position to deposit this second group of uncoated bulbs 30 on the silica-coating line 44. The operating mechanism for the bulb-gripping jaws 266 causes such jaws (FIG. 14) to release this second group of uncoated bulbs 30 ($T_{48}$–$T_{11a}$) and the vertical reciprocating mechanism for the now empty bulb pick-up heads 238 moves such heads to the "left-up" position ($T_{11a}$–$T_{49}$).

Simultaneously, during time $T_{50}$–$T_{51}$ (FIG. 21), the stationary oil cylinder 312 and moving oil cylinder 318 are energized by operation of their respective control devices 321 and 330 (FIG. 20) to cause movement of the carriage 248 and the empty now-open pick-up jaws from the "left-up" position to the "right-up" position, whereupon the vertical reciprocating mechanism for the bulb pick-up heads 238 lowers such heads into juxtaposition about the first group of bulbs 30 which have now been coated on the silica-coating line 42 ($T_{52}$–$T_{12a}$). The operating mechanism for the bulb-gripping jaws 266 closes such jaws about these silica-coated bulbs ($T_{12a}$–$T_{53}$) and the vertical reciprocating mechanism for the bulb pick-up heads moves such now loaded heads upwardly from the "right-down" position to the "right-up" position (FIG. 15) at time ordinate "G" (FIG. 21). Throughout the time period $T_{54}$–$T_{55}$ the control device 321 causes the stationary oil cylinder 312 to move the carriage 248 and the now loaded pick-up heads 238 from the "right-up" position (FIG. 15) to the "center-up" position, where the vertical reciprocating mechanism for the bulb pick-up heads 238 lowers such heads from the "center-up" position to the "center-down" position ($T_{55}$–$T_{56}$). The operating mechanism for the bulb-gripping jaws 266 then again opens such jaws to release the first group of twelve bulbs 30 which were coated on the silica-coating line 42 and are now positioned on the heads 36 of the indexable conveyor 38, as shown in FIG. 16, which is completed at time ordinate "H" (FIG. 21), preparatory to the raising of the now open and empty pick-up heads from the "center-down" position (FIG. 16) to the "center-up" position (FIG. 13) and the indexing of the indexable conveyor 38 during the period $T_1$–$T_2$.

It will be understood from a consideration of FIG. 21 that during the time $T_{35}$–$T_{36}$ (after the coated bulbs 30 have been removed from the silica-coating line 42) that the tilting mechanism 352 (FIGS. 4 and 5) for the coating heads 340 of line 42 moves such coating heads 340 from the solid-line position, shown in FIG. 4, to the dotted line position shown therein, thereby disposing of any broken cullet which may have remained thereon.

Referring now to the group of silica-coated bulbs 30 which have been coated on the silica-coating line 44 and have been indexed adjacent the bulb-elevating mechanisms 50 and 52 in the "bulb-transfer zone" (FIG. 18) during the time $T_{1a}$–$T_{2a}$, the six leading silica-coated bulbs 30 in such group are transferred to the right-hand bulb-elevating mechanism 52, as viewed in FIGS. 1 and 17, by the left-hand lower transfer device 48 ($T_{60}$–$T_{61}$, FIG. 21) simultaneously with the transfer of the last six silica-coated bulbs 30 in such group to the left-hand bulb-elevating mechanism 50 by the right-hand lower transfer device 46.

*Bulb elevating mechanisms*

Since the right-hand bulb-elevating mechanism 52, as viewed in FIGS. 1 and 17, is essentially the same as the left-hand bulb-elevating mechanism 50, it is deemed sufficient to describe only one, such for example, as the right-hand bulb elevating mechanism 52.

This bulb-elevating mechanism 52 has a pair of movable members, suitably chains 460, each extending around and supported by upper guide members and lower guide members, suitably sprockets 462 and 464 respectively, which sprockets are mounted on shafts 466 journalled in brackets 468 secured to the frame legs 68. To provide bulb-receiving and supporting means for the right-hand bulb-elevating mechanism 52, horizontal rows of six heads 470 each (when viewed in FIG. 17) are mounted on angularly shaped supports 472 which in turn are secured to the chains 460 and spaced an index-length apart. For the purpose of synchronizing the indexing of the bulb-elevating mechanism 52 (upwardly one index length) with the indexing of the indexable conveyor 38 during the periods $T_1$–$T_2$ and $T_{1a}$–$T_{2a}$ (FIG. 21), a worm gear 473 (contained within the casting 84, FIG. 1) is affixed to the lower shaft 466 and is engageable by a worm 474 secured to a driven shaft 476 journalled in suitable bearings provided in the castings 84. The right-hand end, of the driven shaft 476, as viewed in FIG. 17, is connected by a chain drive to the shaft 80 of the indexing mechanism for the indexable conveyor 38. This chain drive comprises an upper sprocket 478 on the driven shaft 476, a lower sprocket 480 on the shaft 80 and a chain 482.

Thus, during the period $T_1$–$T_2$ (FIG. 21) when the indexing mechanism for the indexable conveyor 38 moves twelve bulbs 30 (which, for example, had been silica coated on the silica-coating line 44), into the bulb-transfer zone, the rotation of the shaft 80 about a horizontal axis (FIG. 17) rotates the driven shaft 476 and causes the worm 474 to rotate the worm gear 473 on the lower shaft 466 (and hence the sprocket carried thereby) with attendant indexing of the right-hand bulb-elevating mechanism 52 (FIG. 17) upwardly, as indicated by the arrow, one index length.

As shown in FIG. 17 this rotation of the driven shaft 476 also simultaneously causes rotation of a worm 474' (associated with the left-hand bulb-elevating mechanism 50) on the shaft 476 with resultant rotation, as viewed in FIG. 17, of a lower shaft 466' and a lower sprocket 464' of such left-hand bulb-elevating mechanism 50, so that such mechanism 50 also simultaneously indexes upwardly one index length.

During the period of time $T_{60}$–$T_{61}$ (FIG. 21) the left-hand lower transfer device 48 (FIG. 17) is operable to move the six leading silica-coated bulbs 30 disposed on the heads 36 of the indexable conveyor 38 in the bulb-transfer zone from such heads 36 to the right, as viewed in FIG. 17, and onto the row of adjacent heads 470 on the right-hand bulb elevating mechanism 52. Simultaneously therewith the right-hand lower transfer device 46 transfers the six remaining silica-coated bulbs 30 from the heads 36 to the left, as viewed in FIG. 17, and into the six adjacent heads 470' on the left-hand bulb-elevating mechanism 50.

*Lower transfer devices*

Again, since the right-hand lower transfer device 46 (FIGS. 1 and 17) is identical to the left-hand lower transfer device 48, it is deemed sufficient to merely describe the right-hand lower transfer device 46.

Such right-hand lower transfer device 46 has a pusher plate 484 carried by an operating piston rod 486 of an oil cylinder 488 mounted by brackets on the longitudinal channel members 74. Suitable oil lines (FIGS. 17 and 20) connect such oil cylinder 488 to a four-way oil valve "6" of a control device 490 (similar to control device 151), which valve "6" is in operative engagement with a cam on the high-speed shaft 122.

Operation of the control device 490 (FIG. 20) during the period $T_{60}$–$T_{61}$ (FIG. 21) causes oil to flow into the right-hand end of the oil cylinder 488, as viewed in FIG. 17, thereby causing the operating piston rod 486 of such cylinder to move from right to left with attendant engagement of the pusher plate 484 with the rearward six silica-coated bulbs 30, as viewed in FIG. 1, and resultant transfer of such bulbs from the heads 36 on the indexable conveyor 38 to heads 470' on the left-hand bulb-elevating mechanism 50. Simultaneously therewith oil flows into the right-hand end of an oil cylinder 488' (associated with the left-hand bulb-elevating mechanism 50) to cause movement of a pusher plate 484' from left to right, as viewed in FIG. 17, and to similarly transfer the leading six silica-coated bulbs 30 (as viewed in FIG. 1), from the heads 36 to the heads 470 on the right-hand bulb-elevating mechanism 52.

Thereafter, during the successive indexes of the indexable conveyor 38 (periods of time $T_{1a}$–$T_{2a}$; $T_1$–$T_2$ etc., FIG. 21) the row of six silica-coated bulbs 30 on the right-hand bulb-elevating mechanism 52 and row of six silica-coated bulbs 30 on the left-hand bulb-elevating mechanism 50 are indexed upwardly one index length at a time until they are disposed adjacent the right-hand upper transfer device 56 (FIGS. 1 and 17) and the left-hand upper transfer device 54 respectively 16. These upper transfer devices 54 and 56 are operable to transfer the six silica-coated bulbs 30 on the left-hand bulb-elevating mechanism 50 and right-hand bulb elevating mechanism 52 respectively to the left-hand overhead conveyor 58 and right-hand overhead conveyor 60 during the periods of time $T_{62}$–$T_{63}$ and $T_{62a}$–$T_{63a}$ (FIG. 21).

Overhead conveyors

Considering, for example, the right-hand overhead conveyor 60 which is representative of the identical overhead conveyors 58 and 60, such right-hand overhead conveyor 60 has a movable member, suitably a chain 500, extending around and supported by guide members, such as sprockets 502 (FIGS. 17 and 18), which sprockets are mounted on shafts 504 journalled in the frame portions of the silica-coating machine 32. To provide bulb-receiving and supporting means on such upper conveyor 60, heads 506 are mounted on the chain 500. For the purpose of indexing the overhead conveyor 60, one head length at a time in timed relation with the similar indexing movement of the bulb-lehring and sealing-in machine 62, the right-hand sprocket 502, as viewed in FIG. 18, of such overhead conveyor 60 is connected (by means not shown) to the intermittent drive 106 of the bulb-lehring and sealing-in machine 62.

Upper transfer devices

Since the upper transfer devices 54 and 56 (FIGS. 1, 17 and 18) are similar to the lower transfer devices 46 and 48, it is deemed sufficient to say that the right-hand transfer device 56, for example, has a pusher plate 508 carried by an operating piston rod 510 of an oil cylinder 512 which is mounted on plates 514 of the frame of the silica-coating machine 32. Suitable oil lines (FIGS. 17 and 20) connect the oil cylinder 512 to a four-way oil valve "7" (FIG. 20) of a control device 518 (similar to control device 151), the spring-biased operating plunger of which valve "7" is operable by a cam on the high-speed shaft 122.

Thus, during the period of time $T_{62}$–$T_{63}$ (FIG. 21) operation of the control device 518 causes oil to flow through the oil valve "7" and into the right-hand end of the oil cylinder 512, as viewed in FIG. 17. This flow of oil causes attendant movement of the pusher plate 508 from right to left, as viewed in FIG. 17, to transfer six silica-coated bulbs 30 from the heads 470 on the right-hand bulb-elevating mechanism 52 to the heads 506 on the right-hand upper conveyor 60. Simultaneously therewith oil flows into the left-hand end of an oil cylinder 512' of the left-hand upper transfer device 54 to move a pusher plate 508' from left to right to similarly transfer the six silica-coated bulbs on the heads 470' of the left-hand bulb-elevating mechanism 50 to heads 506' on the left-hand upper conveyor 58.

Thereafter, during each index of the bulb-lehring and sealing-in machine 62, the silica-coated bulbs 30 on the upper conveyors 58 and 60 are moved one index at a time toward the bulb-lehring and sealing-in machine 62. At adjacent points 528 and 530 (FIG. 18) in the path of movement of such silica-coated bulbs 30 toward the bulb-lehring and sealing-in machine, they are transferred by means (not shown) to such bulb-lehring and sealing-in machine 62. There the silica coating on the bulbs 30 is lehred and a filamentary mount 532 (FIG. 23) is sealed to the lehred silica-coated bulb 30. After exhaust (not shown) a base 534 is secured to the exhausted lamp by means of a suitable cement and the lead wires of the lamp soldered to the bottom contact and shell of such base 534 to provide a completed silica-coated incandescent lamp, shown in FIG. 23.

It will be recognized by those skilled in the art that the objects of the present invention have been achieved by the provision of a silica-coating machine which is capable of producing about 6000 silica-coated incandescent lamp bulbs per hour. This machine is adapted to automatically remove deleterious solids from the uncoated bulbs prior to the coating operation and to automatically remove broken bulbs from the silica-coating heads. In addition, the indexable conveyor of such silica-coating machine is provided with heads which permit the loading and unloading of the bulbs on either side of such conveyor. Further, a bulb-transfer unit of the silica-coating machine is operable to transfer bulbs to be coated from the indexable conveyor to one silica-coating line for silica-coating and during such silica coating to transfer bulbs which have been silica-coated on another line from such other silica-coating line to the portion of the indexable conveyor vacated by the first group of uncoated bulbs.

While in accordance with the patent statutes one best known embodiment of the invention has been illustrated and described in detail, it is to be particularly understood that the invention is not limited thereto or thereby.

We claim:

1. Apparatus for fabricating successive groups of articles, comprising a movable member for receiving a group of unfabricated articles from an article-loading zone, advancing means connected to said movable member and operable to cause the indexing of the movable member and such group of unfabricated articles successively to an article-transfer zone and thence to an article-discharge zone, said movable member being operable to receive another group of said unfabricated articles in the article-loading zone while the preceding group is in the article-transfer zone, two arrangements of article-supporting heads disposed adjacent the article-transfer zone, each arrangement of said article-supporting heads being operable to receive alternate groups of said unfabricated articles, article-fabricating means operatively associated with each of said article-supporting heads for fabricating the unfabricated article support on the latter, transfer means disposed adjacent the article-transfer zone and operable to transfer such groups of unfabricated articles from the portion of the movable member in said article-transfer zone to one arrangement of the article-supporting heads, and said transfer means being further operable to transfer a group of fabricated articles from the other arrangement of article-supporting heads to the portion of the movable member in said article-transfer zone just vacated by the preceding transferred group of unfabricated articles preparatory to the movement by the advancing means of that portion of the movable member in the article-transfer zone and the group of fabricated articles supported thereby to the article-discharge zone.

2. Apparatus for fabricating successive groups of articles, comprising a movable member for receiving a group of unfabricated articles from an article-loading zone, advancing means connected to said movable member and operable to cause the indexing of the of the movable member and such group of unfabricated articles successively to an article-transfer zone and thence to an article-discharge zone, said movable member being operable to receive another group of said unfabricated articles in the article-loading zone while the preceding group is in the article-transfer zone, two arrangements of article-supporting heads disposed adjacent the article-transfer zone, each arrangement of said article-supporting heads being operable to receive alternate groups of said unfabricated articles, article-fabricating means operatively associated with each of said article-supporting heads for fabricating the unfabricated article supported on the latter, a plurality of transfer heads, one for each article in a group, disposed adjacent the article-transfer zone and operable to secure an unfabricated article therein, operating means connected to said transfer heads and operable to cause said transfer heads to engage and secure such groups of unfabricated articles on the portion of the movable member in said article-transfer zone and to transfer such groups to one arrangement of the article-supporting heads, and said operating means being further operable to cause said transfer heads to engage and secure a group of fabricated articles on the other arrangement of article-supporting heads and to transfer said group of fabricated articles to the portion of the movable member in said article-transfer zone just vacated by the preceding transferred group of unfabricated articles preparatory to the movement by the advancing means of that portion of the movable member in the article-transfer zone and the group of fabricated articles supported thereby to the article-discharge zone.

3. Apparatus for coating successive groups of articles, comprising a movable member for receiving successive groups of uncoated articles from an article-loading zone, advancing means connected to said movable member and operable to cause the indexing of the movable member and each group of uncoated articles successively to an article-transfer zone and thence to an article-discharge zone, two arrangements of article-supporting heads disposed adjacent the article-transfer zone, each arrangement of said article-supporting heads having means connected to said article-supporting heads for oscillating the latter between an article-receiving position and a broken-article-discharging position, coating means associated with said article-supporting heads and operable to apply a coating to the group of uncoated articles on said article-supporting heads when the latter are in the article-receiving position, a plurality of transfer heads, one for each article in a group, disposed adjacent the article-transfer zone and operable to secure an uncoated article therein, operating means connected to said transfer heads and operable to cause said transfer heads to engage and secure such groups of uncoated articles on the portion of the movable member in said article-transfer zone and to transfer such groups to one arrangement of the article-supporting heads, and said operating means being further operable to cause said transfer heads to engage and secure a group of coated articles on the other arrangement of article-supporting heads and to transfer said group of coated articles to the portion of the movable member in said article-transfer zone just vacated by the preceding transferred group of uncoated articles preparatory to the movement by the advancing means of that portion of the movable member in the article-transfer zone and the group of coated articles supported thereby to the article-discharge zone.

4. Apparatus for coating successive groups of articles, comprising a movable member for receiving successive groups of uncoated articles from an article-loading zone, advancing means connected to said movable member and operable to cause the indexing of the movable member and each such group of uncoated articles successively to an article-transfer zone and thence to an article-discharge zone, two arrangements of article-supporting heads disposed adjacent the article-transfer zone, each arrangement of said article-supporting heads having means connected to said article-supporting heads for oscillating the latter between an article-receiving position and a broken-article-discharging position, article-preheating means disposed adjacent said article-supporting heads for rendering the group of uncoated articles electrically conductive, coating means associated with said article-supporting heads and operable to electrostatically apply a coating to the group of preheated articles on said article-supporting heads when the latter are in the article-receiving position, means connected to said coating means and operable to remove residual coating material from said article-supporting heads and the associated coating means after the coating operation is completed, a plurality of transfer heads, one for each article in a group, disposed adjacent the article-transfer zone and operable to secure an uncoated article therein, operating means connected to said transfer heads and operable to cause said transfer heads to engage and secure such groups of uncoated articles on the portion of the movable member in said article-transfer zone and to transfer such groups to one arrangement of the article-supporting heads, and said operating means being further operable to cause said transfer heads to engage and secure a group of coated articles on the other arrangement of article-supporting heads and to transfer said group of coated articles to the portion of the movable member in said article-transfer zone just vacated by the preceding transferred group of uncoated articles preparatory to the movement by the advancing means of that portion of the movable member in the article-transfer zone and the group of coated articles supported thereby to the article-discharge zone.

5. Apparatus for coating successive groups of articles, comprising a movable member for receiving successive groups of uncoated articles from an article-loading zone, advancing means connected to said movable member and operable to cause the indexing of the movable member and each such group of uncoated articles successively to an article-transfer zone and thence to an article-discharge zone, feeding means in said article-loading zone for feeding a group of uncoated articles to the portion of the movable member in the article-loading zone, two arrangements of article-supporting heads disposed adjacent the article-transfer zone, each arrangement of said article-supporting heads having coating means associated with said article-supporting heads and operable to apply a coating to the group of uncoated articles on said article-supporting heads, a plurality of transfer heads, one for each article in a group, disposed adjacent the article-transfer zone and operable to secure an uncoated article therein, operating means connected to said transfer heads and operable to cause said transfer heads to engage and secure such groups of uncoated articles on the portion of the movable member in said article-transfer zone and to transfer such groups to one arrangement of the article-supporting heads, and said operating means being further operable to cause said transfer heads to engage and secure a group of coated articles on the other arrangement of article-supporting heads and to transfer said group of coated articles to the portion of the movable member in said article-transfer zone just vacated by the preceding transferred group of uncoated articles preparatory to the movement by the advancing means of that portion of the movable member in the article-transfer zone and the group of coated articles supported thereby to the article-discharge zone.

6. Apparatus for coating successive groups of articles comprising a movable member for receiving successive groups of uncoated articles from an article-loading zone, advancing means connected to said movable member and operable to cause the indexing of the movable member and each such group of uncoated articles successively to an article-transfer zone and thence to an article-discharge zone, feeding means in said article-loading zone for feeding a group of uncoated articles to the portion of the movable member in the article-loading zone, means aligned with the uncoated articles on said movable member while in the article-loading zone and operable to remove deleterious solids from said uncoated articles, two arrangements of article-supporting heads disposed adjacent the article-transfer zone, each arrangement of said article-supporting heads having coating means associated with said article-supporting heads and operable to apply a coating to the group of uncoated articles on said article-supporting heads when the latter are in the article-supporting position, a plurality of transfer heads, one for each article in a group, disposed adjacent the article-transfer zone and operable to secure an uncoated article therein, operating means connected to said transfer heads and operable to cause said transfer heads to engage and secure such groups of uncoated articles on the portion of the movable member in said article-transfer zone and to transfer such groups to one arrangement of the article-supporting heads, and said operating means being further operable to cause said transfer heads to engage and secure a group of coated articles on the other arrangement of article-supporting heads and to transfer said group of coated articles to the portion of the movable member in said article-transfer zone just vacated by the preceding transferred group of uncoated articles preparatory to the movement by the advancing means of that portion of the movable member in the article-transfer zone and the group of coated articles supported thereby to the article-discharge zone.

7. Apparatus for coating successive groups of articles, comprising a movable member for receiving successive groups of uncoated articles from an article-loading zone, advancing means connected to said movable member and operable to cause the indexing of the movable member and each such group of uncoated articles successively to an article-transfer zone and thence to an article-discharge zone, feeding means in said article-loading zone for feeding a group of uncoated articles to the portion of the movable member in the article-loading zone, means aligned with the uncoated articles on said movable member while in the article-loading zone and operable to remove deleterious solids from said uncoated articles, two arrangements of article-supporting heads disposed adjacent the article-transfer zone, each arrangement of said article-supporting heads having coating means associated with said article-supporting heads and operable to apply a coating to the group of uncoated articles on said article-supporting heads when the latter are in the article-supporting position, a plurality of transfer heads, one for each article in a group disposed adjacent the article-transfer zone and operable to secure an uncoated article therein, operating means connected to said transfer heads and operable to cause said transfer heads to engage and secure such groups of uncoated articles on the portion of the movable member in said article-transfer zone and to transfer such groups to one arrangement of the article-supporting heads, said operating means being further operable to cause said transfer heads to engage and secure a group of coated articles on the other arrangement of article-supporting heads and to transfer said group of coated articles to the portion of the movable member in said article-transfer zone just vacated by the preceding transferred group of uncoated articles preparatory to the movement by the advancing means of that portion of the movable member in the article-transfer zone and the group of coated articles supported thereby to the article-discharge zone, elevator means disposed adjacent the article-discharge zone and adapted to receive a group of coated articles, and discharge means disposed adjacent the article-discharge zone and operable to transfer a group of such coated articles from the portion of the movable member in the article-discharge zone to said elevator means.

8. Apparatus for coating successive groups of lamp bulbs, comprising a movable member for receiving successive groups of uncoated lamp bulbs from a bulb-loading zone, advancing means connected to said movable member and operable to cause the indexing of the movable member and each such group of uncoated lamp bulbs successively to a bulb-transfer zone and thence to a bulb-discharge zone, feeding means in said bulb-loading zone for feeding a group of uncoated lamp bulbs to the portion of the movable member in the bulb-loading zone, means aligned with the uncoated lamp bulbs on said movable member while in the bulb-loading zone and operable to remove deleterious solids from said uncoated lamp bulbs, two arrangements of bulb-supporting heads disposed adjacent the bulb-transfer zone, each arrangement of said bulb-supporting heads having means connected to said bulb-supporting heads for oscillating the latter between a bulb-receiving position and a broken-bulb-discharging position, bulb-preheating means disposed adjacent said bulb-supporting heads for rendering the adjacent group of uncoated lamp bulbs electrically conductive, coating means associated with said bulb-supporting heads and operable to electrostatically apply a coating to the group of preheated uncoated lamp bulbs on said bulb-supporting heads when the latter are in the bulb-supporting position, means connected to said bulb-supporting heads and operable to cause rotation of the latter and such lamp bulbs carried thereby during the coating operation, means connected to said coating means and operable to remove residual coating material from said bulb-supporting heads and the associated coating means after the coating operation is completed, a plurality of transfer heads, one for each lamp bulb in a group, disposed adjacent the bulb-transfer zone and operable to secure an uncoated lamp bulb therein, operating means connected to said transfer heads and operable to cause said transfer heads to engage and secure such groups of uncoated lamp bulbs on the portion of the movable member in said bulb-transfer zone and to transfer such groups to one arrangement of the bulb-supporting heads, said operating means being further operable to cause said transfer heads to engage and secure a group of coated lamp bulbs on the other arrangement of bulb-supporting heads and to transfer said group of coated lamp bulbs to the portion of the movable member in said bulb-transfer zone just vacated by the preceding transferred group of uncoated lamp bulbs preparatory to the movement by the advancing means of that portion of the movable member in the bulb-transfer zone and the group of coated lamp bulbs supported thereby to the bulb-discharge zone, elevator means disposed adjacent the bulb-discharge zone and adapted to receive a group of coated lamp bulbs, and discharge means disposed adjacent the bulb-discharge zone and operable to transfer a group of such coated lamp bulbs from the portion of the movable member in the bulb-discharge zone to said elevator means.

9. A transfer device for a machine for fabricating successive groups of articles and having a plurality of article-fabricating lines disposed adjacent an article-transfer zone of the machine, comprising a plurality of article-transfer heads one for each article in a group, normally disposed adjacent the article-transfer zone, each article-transfer, head being operable to secure an article therein, and operating means connected to said article-transfer heads and operable to cause said article-transfer heads to engage and secure one group of unfabricated articles in said article-transfer zone and to transfer said one group of unfabricated articles to one article-fabricating line, said operating means being further operable to cause said article-transfer heads to engage and secure a group of fabricated articles on another article-fabricating line and to transfer said one group of fabricated articles to said article-transfer zone.

10. A transfer device for a machine for fabricating successive groups of articles and having a plurality of article-fabricating lines disposed adjacent an article-transfer zone of the machine, comprising a plurality of article-transfer heads, one for each article in a group, normally disposed adjacent the article-transfer zone, each article-transfer head having article-gripping means thereon, operating means connected to said article-gripping means and operable to cause said article-gripping means to engage and secure one group of unfabricated articles in said article-transfer zone, drive means connected to said transfer heads for causing said article-transfer heads to transfer said one group of unfabricated articles carried thereby to one article-fabricating line, said operating means being further operable to cause said article-gripping means to engage and secure a group of fabricated articles on another article-fabricating line, and said drive means being further operable to cause said article-transfer heads to transfer said one group of fabricated articles carried thereby to said article-transfer zone.

11. A transfer device for a machine for fabricating successive groups of articles and having a plurality of article-fabricating lines disposed adjacent an article-transfer zone of the machine, comprising a plurality of article-transfer heads, one for each article in a group, normally disposed above the article-transfer zone, each article-transfer head having article-gripping means thereon, operating means connected to such article-gripping means for causing securement of articles therein and their release therefrom, vertical reciprocating means operatively associated with said article-transfer heads for causing movement of said article-transfer heads between a path of movement between said article-fabricating lines and said article transfer zone and pick-up and discharge positions adjacent said article-fabricating lines and the article transfer zone, and horizontal reciprocating means connected to said article-transfer units and operable to cause movement of such article-transfer heads along said path of movement between said article-fabricating lines and such article-transfer zone, said article-transfer heads being operable to engage and secure one group of unfabricated articles therein while in the pick-up position in said article-transfer zone and to transfer said one group of unfabricated articles to one article-fabricating line, said article-transfer heads being further operable to engage and secure therein a group of fabricated articles on another article-fabricating line while in another pick-up position and to transfer said one group of fabricated articles to said article-transfer zone.

References Cited in the file of this patent

UNITED STATES PATENTS

| | | |
|---|---|---|
| 885,912 | Chilton | Apr. 28, 1908 |
| 1,593,825 | Higgins | July 27, 1926 |
| 1,596,733 | Higgins | Aug. 17, 1926 |
| 1,916,568 | Gruetter | July 4, 1933 |
| 2,139,403 | Cole | Dec. 6, 1938 |
| 2,541,574 | Crooks | Feb. 13, 1951 |
| 2,567,033 | Schutz | Sept. 4, 1951 |
| 2,611,493 | Nordquist | Sept. 23, 1952 |
| 2,730,068 | Reynolds et al. | Jan. 10, 1956 |
| 2,811,131 | Lopenski et al. | Oct. 29, 1957 |